(12) United States Patent
Matsumoto et al.

(10) Patent No.: US 8,612,811 B2
(45) Date of Patent: Dec. 17, 2013

(54) DEFECTIVE-RATIO PREDICTING METHOD, DEFECTIVE-RATIO PREDICTING PROGRAM, MANAGING METHOD FOR SEMICONDUCTOR MANUFACTURING APPARATUS, AND MANUFACTURING METHOD FOR SEMICONDUCTOR DEVICE

(75) Inventors: Chizu Matsumoto, Fujisawa (JP);
Yuichi Hamamura, Yokohama (JP);
Yoshiyuki Tsunoda, Kanagawa (JP);
Kazuyuki Tsunokuni, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 107 days.

(21) Appl. No.: 13/119,633

(22) PCT Filed: Sep. 4, 2009

(86) PCT No.: PCT/JP2009/065478
§ 371 (c)(1),
(2), (4) Date: Apr. 1, 2011

(87) PCT Pub. No.: WO2010/032631
PCT Pub. Date: Mar. 25, 2010

(65) Prior Publication Data
US 2011/0172806 A1 Jul. 14, 2011

(30) Foreign Application Priority Data
Sep. 19, 2008 (JP) .................................. 2008-241415

(51) Int. Cl.
*G11C 29/56* (2006.01)

(52) U.S. Cl.
USPC ........................................................ 714/718

(58) Field of Classification Search
USPC ................................................... 714/723, 718
See application file for complete search history.

(56) References Cited

U.S. PATENT DOCUMENTS

| 6,392,434 | B1 * | 5/2002 | Chiu ......................... 324/759.01 |
| 6,522,159 | B1 * | 2/2003 | Nishide .................... 324/762.03 |
| 6,701,477 | B1 * | 3/2004 | Segal ............................. 714/732 |
| 6,807,453 | B1 * | 10/2004 | Suzuki .......................... 700/110 |
| 6,819,788 | B2 * | 11/2004 | Ohta ............................. 382/145 |
| 7,137,085 | B1 * | 11/2006 | Wang et al. ................... 716/136 |

(Continued)

FOREIGN PATENT DOCUMENTS

| JP | 6-275688 A | 9/1994 |
| JP | 2004-355717 A | 12/2004 |

(Continued)

*Primary Examiner* — Ajay Bhatia
*Assistant Examiner* — Thien D Nguyen
(74) *Attorney, Agent, or Firm* — Mattingly & Malur, PC

(57) ABSTRACT

In a managing system for a semiconductor manufacturing apparatus, a predicting unit 121 predicts a characteristic defective ratio and a foreign-substance defective ratio of each process obtains an actual defective ratio of each fail bit mode and a critical area of each process and each fail bit mode, calculates the number of foreign substances of each process by using the actual defective ratio of each fail bit mode and the critical area of each process and each fail bit mode, the fail bit mode being except for an arbitrary fail bit mode, calculates a foreign-substance defective ratio of each process and a foreign-substance defective ratio of each fail bit mode by using the number of foreign substances, and calculates a characteristic defective ratio of the arbitrary fail bit mode based on the foreign-substance defective ratio and actual defective ratio of each fail bit mode.

17 Claims, 9 Drawing Sheets

(56) References Cited

U.S. PATENT DOCUMENTS

| | | | |
|---|---|---|---|
| 8,185,336 B2* | 5/2012 | Furukawa et al. | 702/118 |
| 2001/0006558 A1* | 7/2001 | Ohta | 382/145 |
| 2002/0006497 A1* | 1/2002 | Noda | 428/156 |
| 2003/0208337 A1* | 11/2003 | Hong | 702/185 |
| 2004/0243891 A1* | 12/2004 | Ohta | 714/721 |
| 2008/0140330 A1* | 6/2008 | Morioka et al. | 702/81 |
| 2010/0114520 A1* | 5/2010 | Furukawa et al. | 702/118 |

FOREIGN PATENT DOCUMENTS

| | | |
|---|---|---|
| JP | 2008-130110 A | 6/2006 |
| JP | 2006-222118 A | 8/2006 |
| JP | 2007-227705 A | 9/2007 |
| JP | 2009-205717 A | 9/2009 |

* cited by examiner

DEFECTIVE-RATIO PREDICTING METHOD, DEFECTIVE-RATIO PREDICTING PROGRAM, MANAGING METHOD FOR SEMICONDUCTOR MANUFACTURING APPARATUS, AND MANUFACTURING METHOD FOR SEMICONDUCTOR DEVICE

TECHNICAL FIELD

The present invention relates to a method of discriminating a type of defect using electrical test results and layout simulation results in a product which is a thin-film device as represented by an LSI and on which one or a plurality of memory devices are mounted. Also, the present invention relates to a technique effectively applied to a method of managing a semiconductor manufacturing apparatus of comparing a manufacturing history of the manufacturing apparatus based on the discrimination results to specify a cause of each type of defect, and a method of manufacturing a semiconductor device using the managing method.

BACKGROUND ART

In recent years, in achieving a microfabricated and highly-functional semiconductor device, the type of defects in a highly-integrated memory device has been particularly various among functional modules. In addition to foreign-substance defects such as a wiring short, disconnection, and interlayer disconnection defects due to foreign substances occurring in each process, a lot of systematic defects (parametric defects) such as a defective wiring pattern shape due to thickness variation in an in-plane wafer and variations in transistor operation have increasingly occurred (hereinafter, these defects are referred to as characteristic defects). Therefore, in order to quickly start up a yield, it is important to quantify a ratio of occurrences of the characteristic defects and foreign-substance defects of each process, and further, to specify the cause of the defects by investigating a manufacturing apparatus, chamber, and manufacturing condition for each cause of the defects and take an action for the cause of the defects.

In a memory device, as one of the defect analyzing methods, a fail-bit analyzing method has been conventionally widely used, in which a circuit is electrically judged as pass or failure for each cell which is a minimum unit for data reading/writing. An influential range of the failure cell differs depending on a size of the occurring foreign substance and a location of the occurrence such that the defect has occurred due to a short circuit by a word line and a data line or by a data line, a power supply line, and a word line. Therefore, in the fail-bit analyzing method, depending on the region of occurrence of such a defective cell, occurring defects are defined as a fail bit mode such as a single-bit defect, a pair-bit defect, and a word-line defect. In this manner, from a ratio of occurrence of the fail bit mode, it is possible to estimate in which layer, on which wiring, and with which degree of the size the foreign substance has occurred, and, as a method of quantifying the ratio of occurrence of the fail bit mode, the following method has been reported (Patent Document 1).

The defective ratio of each fail bit mode can be expressed by Expression (1) in a case of assumption of a Poisson model for yield prediction.

[Expression 1]

$$\begin{bmatrix} Ac_{FBM1\_Layer1} & Ac_{FBM1\_Layer2} & Ac_{FBM1\_Layer3} & \vdots & Ac_{FBM1\_Layern} \\ Ac_{FBM2\_Layer1} & Ac_{FBM2\_Layer2} & Ac_{FBM2\_Layer3} & \vdots & Ac_{FBM2\_Layern} \\ Ac_{FBM3\_Layer1} & Ac_{FBM3\_Layer2} & Ac_{FBM3\_Layer3} & \vdots & Ac_{FBM3\_Layern} \\ \vdots & \vdots & \vdots & \vdots & \vdots \\ Ac_{FBMm\_Layer1} & Ac_{FBMm\_Layer2} & Ac_{FBMm\_Layer3} & \vdots & Ac_{FBMm\_Layern} \end{bmatrix} \quad (1)$$

$$\begin{bmatrix} D0_{Layer1} \\ D0_{Layer2} \\ D0_{Layer3} \\ \vdots \\ D0_{Layern} \end{bmatrix} = \begin{bmatrix} -\ln(1 - F_{FBM1}) \\ -\ln(1 - F_{FBM2}) \\ -\ln(1 - F_{FBM3}) \\ \vdots \\ -\ln(1 - F_{FBMm}) \end{bmatrix}$$

Here, "$D0_{Layern}$" represents the number of foreign substances of each process, "$F_{FBMm}$" represents a defective ratio of each fail bit mode, and "$Ac_{FBMm\_Layern}$" represents a critical area which is an integrated value of a foreign-substance sensitivity "$\theta_{FBMm\_Layern}$" of each process in each fail bit mode with a memory device area A. The foreign-substance sensitivity $\theta_{FBMm\_Layern}$ of each fail bit mode is calculated from a foreign-substance sensitivity "$\theta_{Wiring\ combination\_Layern}$" of each wiring combination. The foreign-substance sensitivity $\theta_{Wiring\ combination\_Layern}$ of each wiring combination can be calculated (by Expression (3)) as summation of products of a foreign-substance occurrence probability function "f(x)" indicating an occurrence probability of each size of the foreign substance expressed by Expression (2) with a critical probability distribution "$g(x)_{Wiring\ combination\_Layern}$" of each size of the foreign substance and each wiring combination calculated by a simulation for judging a critical foreign substance by virtually dropping the foreign substance onto a design layout of each process whose wiring names such as a power-supply line and a data line are previously defined.

[Expression 2]

$$f(x) = (n-1) \times X0^{(n-1)} \times X^{-n} \quad (2)$$

[Expression 3]

$$\theta_{Wiring\ combination\_Layern} = \sum_{x0}^{\infty} f(x) \times g(x)_{Wiring\ combination\_Layern} \quad (3)$$

Here, "n" in Expression (2) represents a particle-size distribution parameter, and "X0" represents a minimum defect size. By finding a defective wiring combination, a resulting fail bit mode can be defined. Therefore, from the foreign-substance sensitivity $\theta_{Wiring\ combination\_Layern}$ of each process and each wiring combination, "$\theta_{FBMm\_Layern}$" for each process and for each fail bit mode is calculated by Expression (4).

[Expression 4]

$$\theta_{FBMm\_Layern} = \sum_{1}^{N} \theta_{Wiring\ combination\_Layern} \quad (4)$$

Here, "N" represents a total number of wiring combinations resulting in an arbitrary fail bit mode. The critical area $Ac_{FBMm\_Layern}$ calculated by multiplying this $\theta_{FBMm\_Layern}$ by the memory device area and an actual defective ratio $F_{FBMm}$ of each fail bit mode are substituted into the yield-calculating Expression (1), and an inverse matrix is solved, so that the number of foreign substances of each process is calculated.

PRIOR ART DOCUMENT

Patent Document
U.S. Pat. No. 6,701,477(B1)

DISCLOSURE OF THE INVENTION

Problems to be Solved by the Invention

Meanwhile, in the quantifying method in the fail-bit analyzing method as described above, if the characteristic defective ratio and the number of foreign substances of each process for each wafer can be accurately quantified, the causes of the defects can be separated for each defective type and investigated by, for example, comparing between a manufacturing history of a wafer in which the characteristic defect frequently occurs and that of a wafer in which the characteristic defect does not frequently occur. Therefore, identification of the cause of each defect and the action for the defect can be accelerated.

However, since the above-described method is based on an assumption that every fail-bit actual defective ratio is determined by a foreign-substance defect, the characteristic defective ratio cannot be quantified. Therefore, in a wafer in which the characteristic defect and the foreign-substance defect occur, a problem of a low estimate accuracy of the foreign-substance defective ratio of each process arises.

Accordingly, the present invention has been made in taking into consideration the above-described problems. A typical preferred aim is to provide a predicting method and its program for predicting a characteristic defective ratio and a foreign-substance defective ratio of each process for each wafer with high accuracy, a method of managing a semiconductor manufacturing apparatus for identifying a cause of the defect based on a difference in a ratio of occurrence between the characteristic defect and the foreign-substance defect of each process for each wafer, which are clarified by the prediction, and a method of manufacturing a semiconductor device using the managing method.

The above and other preferred aims and novel characteristics of the present invention will be apparent from the description of the present specification and the accompanying drawings.

Means for Solving the Problems

Typical ones of the embodiments disclosed in the present application will be briefly described as follows.

That is, a typical one is summarized that, an actual defective ratio of each fail bit mode and a critical area of each process in each fail bit mode are obtained, the number of foreign substances of each process is calculated by using the actual defective ratio of each fail bit mode and the critical area of each process in each fail bit mode except for an arbitrary fail bit mode, a foreign-substance defective ratio of each process and a foreign-substance defective ratio of each fail bit mode are calculated by using the number of foreign substances of each process, and a characteristic defective ratio of the arbitrary fail bit mode is calculated based on the foreign-substance defective ratio of each fail bit mode and the actual defective ratio of each fail bit mode.

More specifically, as described below, a managing system for a semiconductor manufacturing apparatus by estimating the characteristic defective ratio and the number of foreign substances of each process for each wafer is effective, that is, a managing method for a semiconductor manufacturing apparatus whose object is a memory device region, a system using the method, and a manufacturing method for a semiconductor device using the system. These methods and system have features such that one or a plurality of memory devices mounted on the thin-film product are an object, and, in other fail bit modes except for a fail bit mode where a characteristic defect occurs, the number of foreign substances of each process is matched with others so as to minimize a gap between an actual defective ratio and a fail-bit defective ratio predicted by using initial values of a critical area of each process in each fail bit mode and the number of foreign substances of each process, a defective ratio calculated from the number of foreign substances of each process is taken as a foreign-substance defective ratio, and a gap between this foreign-substance defective ratio and the actual defective ratio is quantified as the characteristic defective ratio.

Also, there is a managing method for a semiconductor manufacturing apparatus, a system using the method, and a manufacturing method for a semiconductor device using the system having features such that the memory device of a thin-film product includes: a storage unit for storing calculation results of the characteristic defective ratio and the foreign-substance defective ratio of each process; an input unit for a manufacturing history of an objective wafer; an arithmetic unit for comparing the manufacturing history of the objective wafer; and a displaying/outputting unit for the comparison result, and a difference in a ratio of occurrence between the characteristic defect and the foreign-substance defect of each process for each wafer, which are clarified by the predicting method, is clarified by comparing the manufacturing history.

Effects of the Invention

The effects obtained by typical aspects of the present invention will be briefly described below.

That is, the effect obtained by a typical aspect of the invention is that a characteristic defective ratio and a foreign-substance defective ratio of each process can be quantified with high accuracy for each objective fail bit analysis result. Therefore, by applying the method to a plurality of wafers, manufacturing apparatuses and manufacturing conditions can be compared and analyzed based on a difference in the defective ratio for each wafer and each cause of the defect, so that this method can contribute to vertically start up a yield by accelerating identification of the cause.

BRIEF DESCRIPTIONS OF THE DRAWINGS

Figure 11:
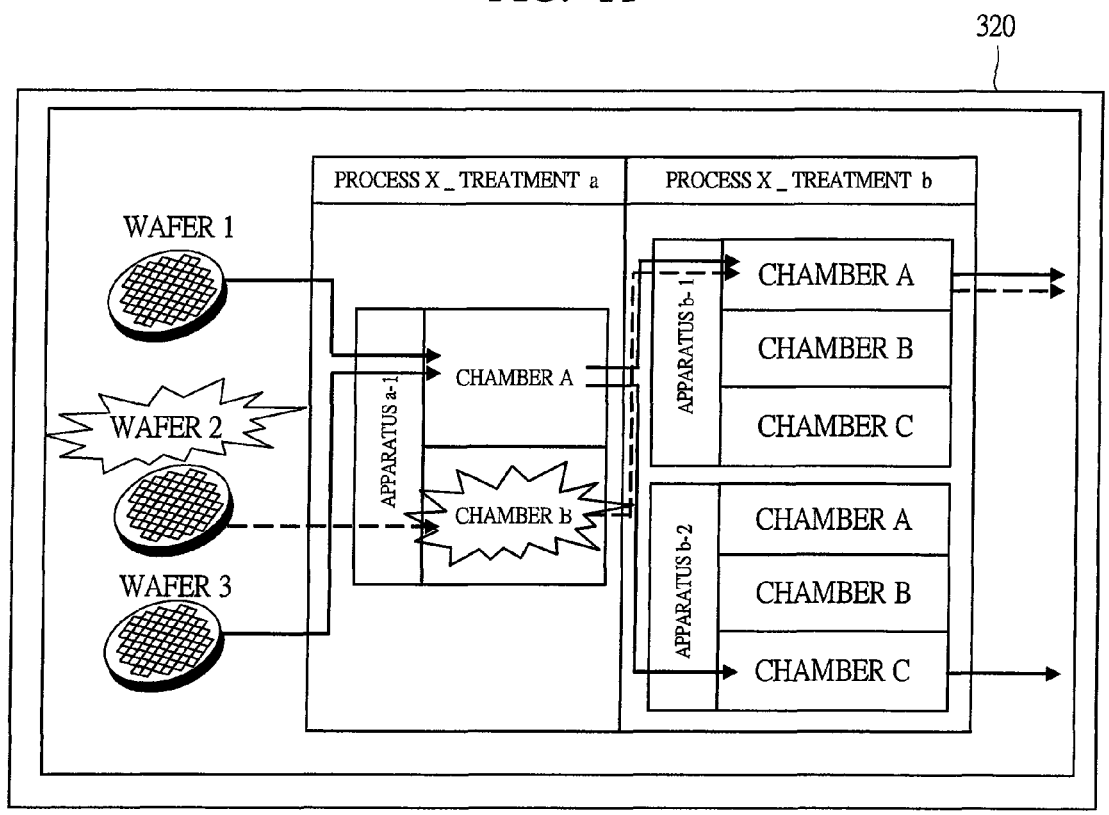
Figure 12:
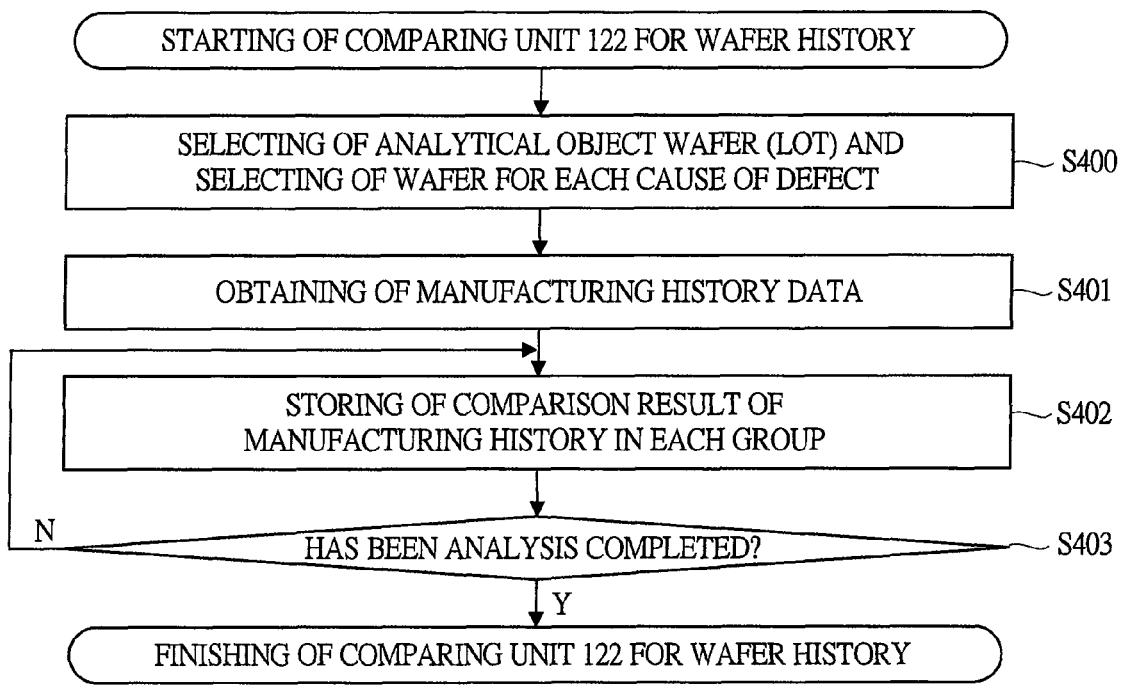

FIG. 11 is a schematic diagram illustrating a graph showing a comparison result of a manufacturing history among a defect-occurring wafer and normal wafers in the embodiment (the fifth embodiment) of the present invention; and FIG. 12 is a flowchart showing a method of identifying an apparatus in which the defect occurs by comparing the manufacturing history in the embodiment (the fifth embodiment) of the present invention.

BEST MODE FOR CARRYING OUT THE INVENTION

Hereinafter, embodiments of the present invention will be described in detail with reference to the accompanying drawings. Note that components having the same function are denoted by the same reference symbols throughout the drawings for describing the embodiment, and the repetitive description thereof will be omitted.

<Summary of Embodiments>

Figure 1:
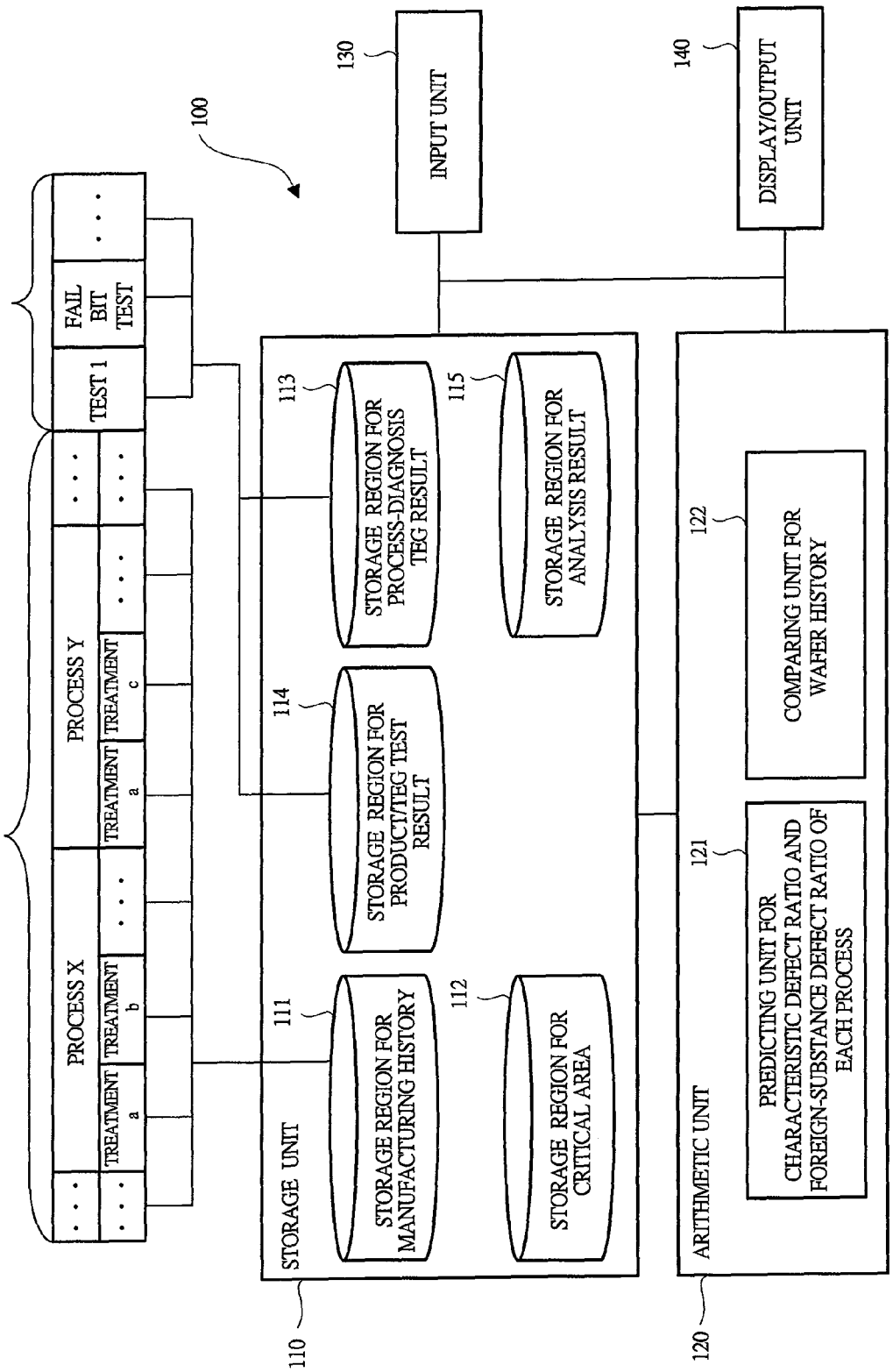
FIG. 1 is a schematic diagram illustrating a system of managing a semiconductor manufacturing apparatus according to embodiments of the present invention.

FIG. 1 is a schematic diagram illustrating a managing system 100 for a semiconductor manufacturing apparatus according to embodiments of the present invention. As illustrated, the managing system 100 according to the present embodiments includes: a storage unit 110; an arithmetic unit 120; an input unit 130; and a display/output unit 140. The storage unit 110 includes: a storage region 111 for a manufacturing history; a storage region 112 for a critical area; a storage region 113 for a process-diagnosis TEG result; a storage region 114 for product/TEG test result; and a storage region 115 for an analysis result. The arithmetic unit 120 includes: a predicting unit 121 for a characteristic defective ratio and a foreign-substance defective ratio of each process; and a comparing unit 122 for a wafer history.

This managing system 100 is structured by using a computer system, and the storage unit 110 is achieved by a device such as an HDD and a memory, the arithmetic unit 120 is achieved by a device such as a CPU, the input unit 130 is achieved by a device such as a keyboard and a mouse, and the display/output unit 140 is achieved by a device such as a display and a printer. The predicting unit 121 for the characteristic defective ratio and the foreign-substance defective ratio of each process and the comparing unit 122 for the wafer history in the arithmetic unit 120 are achieved by executing a managing program comparing a defective-ratio predicting program and a history comparing program stored in the HDD or others by the CPU.

The predicting unit 121 for the characteristic defective ratio and the foreign-substance defective ratio of each process is a unit for obtaining an actual defective ratio of each fail bit mode and a critical area of each process in each fail bit mode from the storage unit 110, and calculating a characteristic defective ratio and a foreign-substance defective ratio of each process by using the obtained actual defective ratio of each fail bit mode and critical area of each process in each fail bit mode. The comparing unit 122 for the wafer history is a unit for comparing a manufacturing history of each wafer with another based on a ratio of occurrence of the characteristic defective ratio and the foreign-substance defective ratio of each process calculated by the predicting unit 121 for the characteristic defective ratio and the foreign-substance defective ratio of each process, and calculating a defect-suspected manufacturing apparatus and manufacturing condition as the comparison result.

To the managing system 100 according to the present embodiment, a semiconductor manufacturing apparatus for each manufacturing process for manufacturing a functional module including a memory device on a wafer, a test apparatus for testing the functional module including the memory device in each manufacturing process, and others are connected. From the semiconductor manufacturing apparatus to the storage region 111 for the manufacturing history in the storage unit 110, a manufacturing history is transmitted. Also, from the test apparatus to the storage region 113 for the process-diagnosis TEG result, the process-diagnosis TEG result is transmitted. To the storage region 114 for the product/TEG test result, the product/TEG test result is transmitted.

The storage region 111 for the manufacturing history stores information about a used apparatus, apparatus parameter, and manufacturing condition for each wafer as the manufacturing history of each wafer. For example, when processes such as resist coating, pre-baking, and exposure are performed in a photolithography process, the storage region 111 for the manufacturing history stores apparatus parameters such as a temperature and a pressure inside the apparatus in these processes, manufacturing conditions therein, and information about the used apparatus for each wafer.

The storage region 112 for the critical area stores information about a critical area of each process in each fail bit mode in the memory module, a critical area of each process in the functional module, and others, calculated by a layout simulation in which a plurality of foreign substances are virtually dropped at random onto a design layout whose wiring names are previously defined.

The storage region 113 for the process-diagnosis TEG result stores a result of a process diagnosis of each wafer. The storage region 114 for the product/TEG test result stores a test result of each wafer for each test condition. The storage region 115 for the analysis result stores a fail-bit analysis result.

By using the managing system 100 for a semiconductor manufacturing apparatus according to the present embodiment, a managing method for the semiconductor manufacturing apparatus containing a defective-ratio predicting method and a history comparing method is achieved. And, by using this managing method, a manufacturing method for a semiconductor device is achieved. For example, the defective-ratio prediction and history comparison are performed on a previously-manufactured semiconductor device (a device on which a functional module including a memory device is manufactured), and these results are reflected to a subsequently-manufactured semiconductor device, so that improvement in the yield of the semiconductor device can be contributed.

A memory unit of the memory device has a structure in which a minimum unit for a transistor operation called cell is repeatedly arranged in a matrix (vertically and horizontally). For example, in a case that wirings connecting between transistors arranged within one cell are shorted out, one cell inside is defective. On the other hand, in a case that a word line and a power supply line for commonly supplying a current to cells arranged in the same direction are shorted out, all cells on the same line are defective, and therefore, such a characteristic defective pattern appears depending on a cause of the defect and a defective position. Therefore, in the fail-bit analysis which is one of electrical pass/failure judgment tests in the manufacturing, from a ratio of occurrence of each fail bit mode obtained by categorizing a result of the pass/failure judgment of the cell as a fail bit mode, it can be estimated in which process and to what degree (how many) the defect has occurred.

Figure 2:
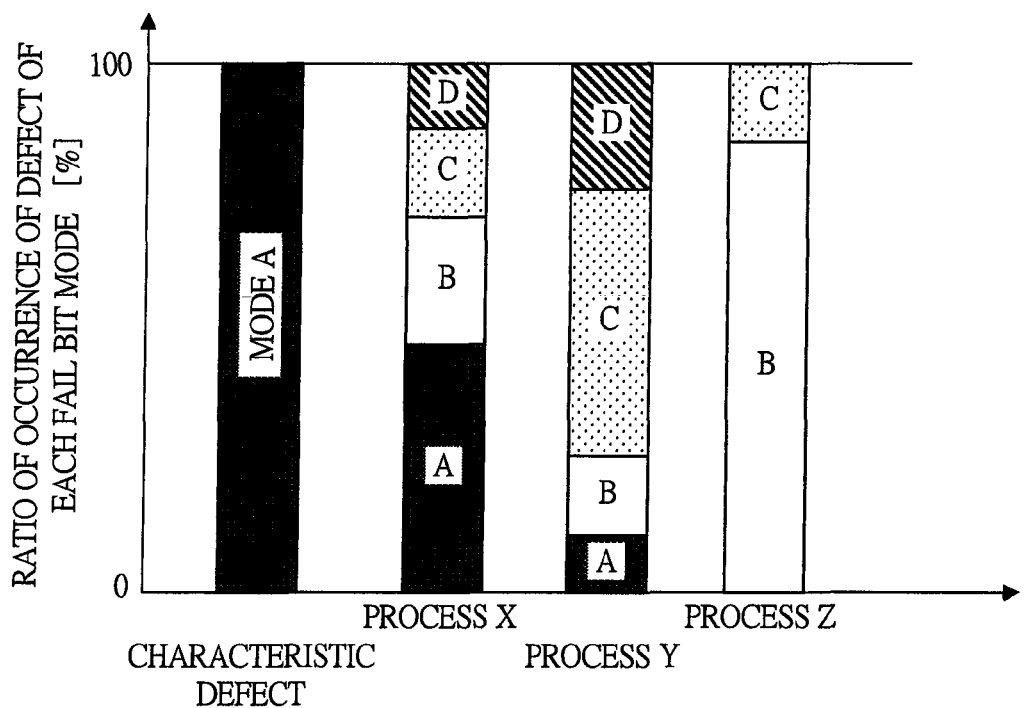
FIG. 2 is a conceptual diagram illustrating a defect occurrence ratio of each fail bit mode and each cause of the defect in the embodiments of the present invention.

Here, a ratio of occurrence of defects of each fail bit mode caused by the characteristic defects and the foreign-substance defects of each process is different from the other as illustrated in FIG. 2. Therefore, in the predicting unit 121 for the characteristic defective ratio and the foreign-substance defective ratio of each process, the characteristic defective ratio and the foreign-substance defective ratio of each process are quantified by using this difference in the ratio of occurrence. The example of FIG. 2 illustrates the ratios of occurrence of each fail bit mode caused by of the characteristic defect and the foreign-substance defects in processes X, Y, and Z. In each fail bit mode, for example, as illustrated in FIG. 3 described later, a mode A represents a single-bit defect which is the single bit mode, a mode B represents a pair-bit defect, a mode C represents an X-direction line defect, and a mode D represents a Y-direction line defect.

As including a method of quantifying the characteristic defect ratio and the foreign-substance defect ratio of each process and others, a feature of the present invention is specifically described in each embodiment. Note that each embodiment described below is not irrelevant to the other, and the one relates to the entire or a part of the other as a modification example, details, or a supplementary explanation thereof, and the present invention can be achieved by arbitrarily combining each embodiment with the other.

<First Embodiment>

Figure 3:
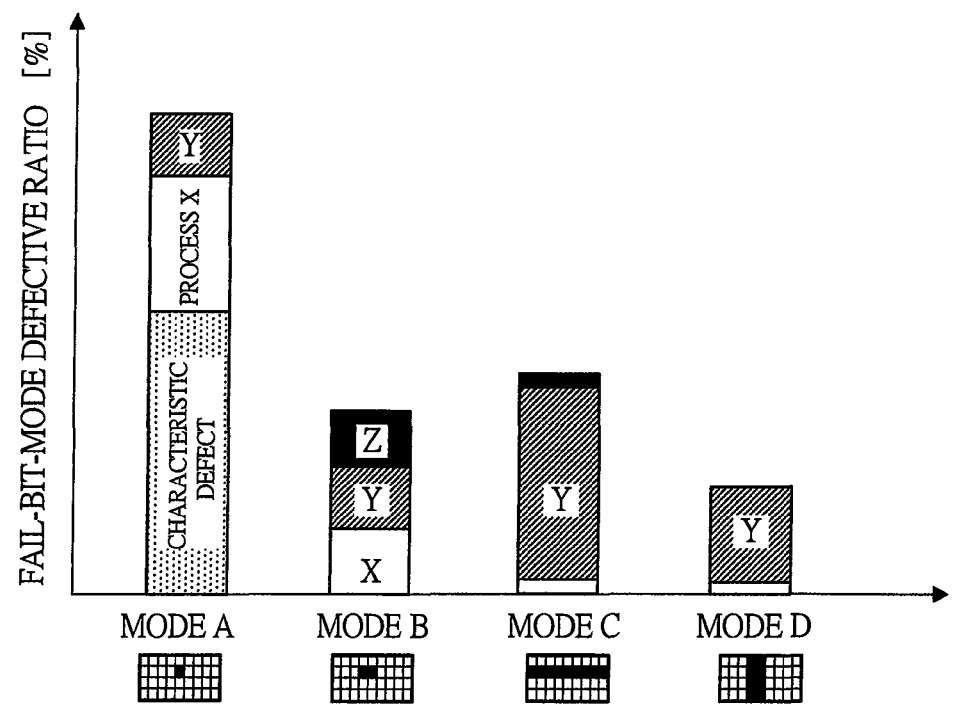
FIG. 3 is a conceptual diagram illustrating a defect occurrence ratio of each cause of the defect and each fail bit mode in the embodiments of the present invention.
Figure 4:
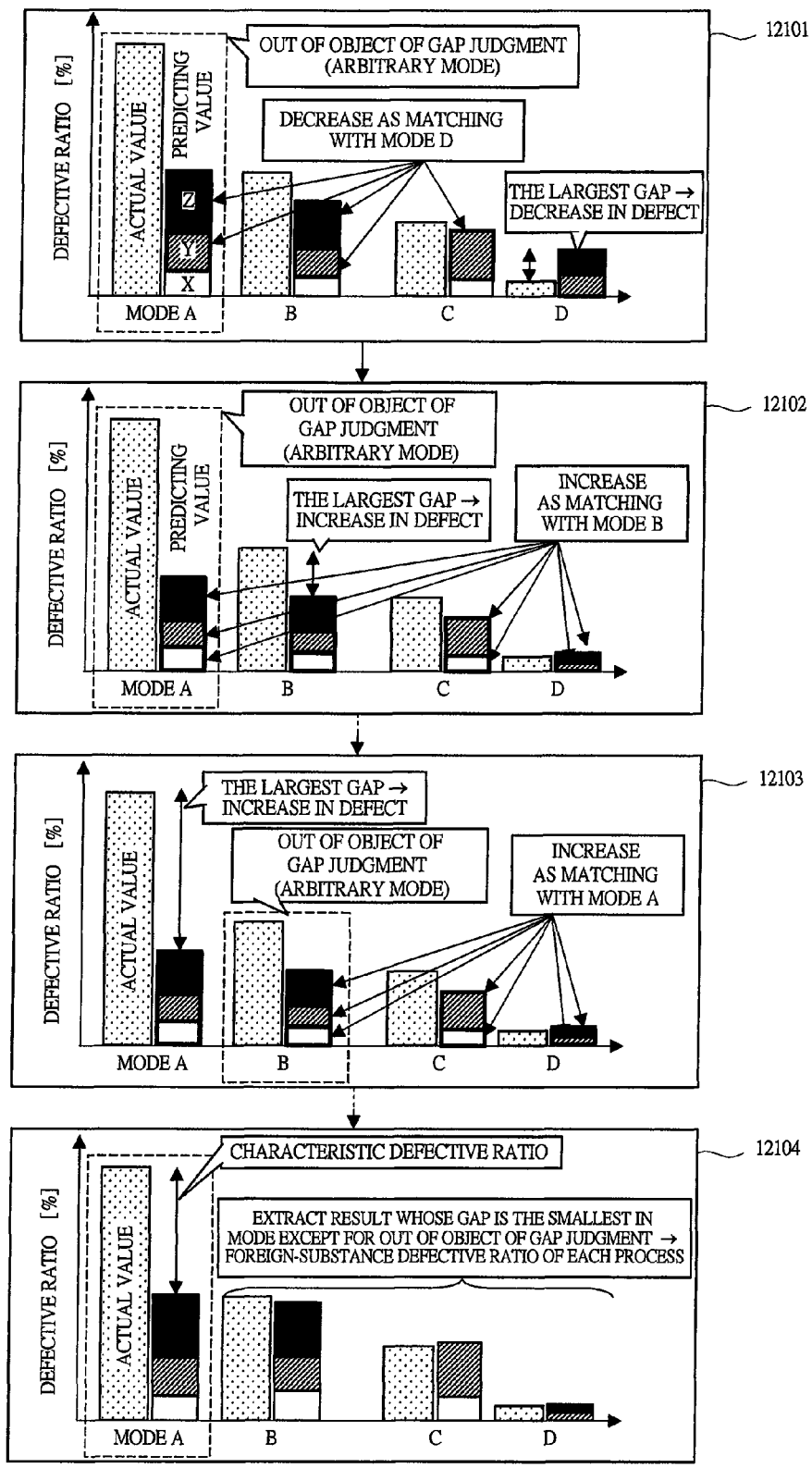
FIG. 4 is a schematic diagram illustrating a method of calculating a characteristic defective ratio and a foreign-substance defective ratio of each process in an embodiment (a first embodiment) of the present invention.
Figure 5:
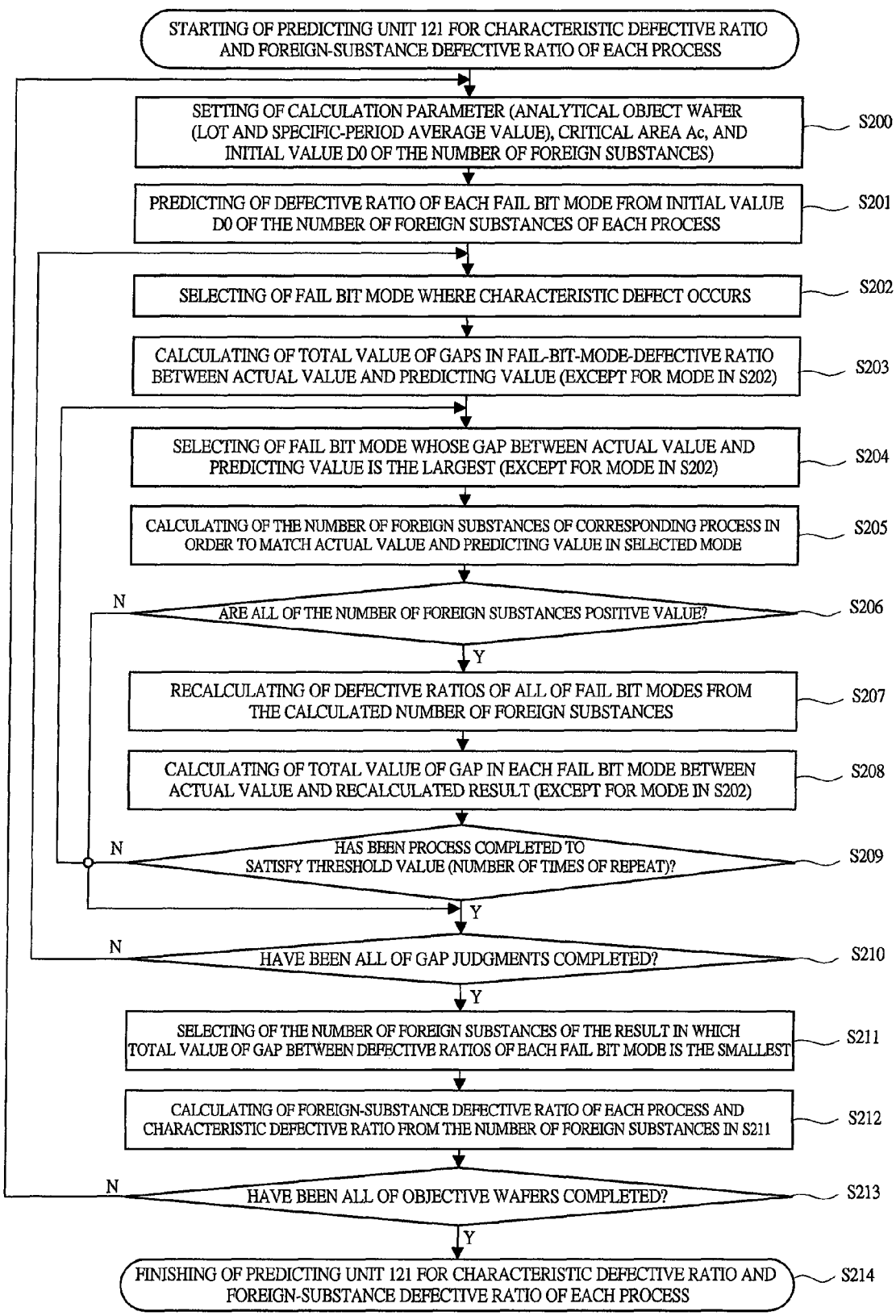
FIG. 5 is a flowchart showing the method of calculating the characteristic defective ratio and the foreign-substance defective ratio of each process in the embodiment (the first embodiment) of the present invention.

A first embodiment using the above-described managing system 100 for the semiconductor manufacturing apparatus illustrated in FIG. 1 is described based on FIGS. 3, 4, and 5.

As described above, the foreign-substance defective ratio of each fail bit mode can be calculated by substituting the critical area $Ac_{FBMm\_Layern}$ of each process in each fail bit mode and the number of foreign substances $D0_{Layern}$ of each process into the Expression (1). However, the cause of the characteristic defect may be different depending on each wafer, and therefore, modeling is difficult. Therefore, a method of quantifying the characteristic defect has been devised, in which the number of foreign substances $D0_{Layern}$ of each process is calculated first from the other fail bit modes (the modes B, C, and D in FIG. 3) except for the fail bit mode (the mode A in FIG. 3) where the characteristic defect occurs, and a result of the calculation is substituted into Expression (1) to calculate the foreign-substance defective ratio $F_{FBMm}$ of each fail bit mode, so that the characteristic defective ratio is quantified as a difference between this foreign-substance defective ratio and an actual defective ratio $f_{FBMm}$.

That is, as illustrated in "12101" of FIG. 4, the number of foreign substances $D0_{Layern}$ (initial value) of an arbitrary process and the critical area $Ac_{FBMm\_Layern}$ of each process in each fail bit mode calculated from the layout simulation are substituted into Expression (1) to calculate an initial value of the foreign-substance defective ratio $F_{FBMm}$ of each fail bit mode. Here, as the number of foreign substances $D0_{Layern}$ (initial value) of each process, a process-diagnosis TEG result may be used, or an arbitrary value may be set. Next, the fail bit mode containing the characteristic defect is set to be out of the object, and a degree of the gap between the actual defective ratio $f_{FBMm}$ and the predicting defective ratio $F_{FBMm}$ of each of the other fail bit modes is converted and calculated into the number of foreign substances $D0_{FBMm\text{-}fbmm}$ by Expression (5), so that a fail bit mode whose number of foreign substances is the largest is selected.

[Expression 5]

$$D0_{FBM\text{-}fbm} = -\ln((1-F_{FBMm})/(1-f_{FBMm}))/Ac_{FBMm}$$

In case of $(1-F_{FBMm})/(1-f_{FBMm}) \leq 1$ $$D0_{FBM\text{-}fbmm} = -\ln((1-f_{FBMm})/(1-F_{FBMm}))/Ac_{FBMm}$$

In case of $(1-F_{FBMm})/(1-f_{FBMm}) > 1$ \hfill (5)

Here, $D0_{FBMm\text{-}fbmm}$ represents a value obtained by converting the gap in an arbitrary fail bit mode between the actual defective ratio and the predicting defective ratio into the number of foreign substances, $Ac_{FBMm}$ represents the critical area of the arbitrary fail bit mode, $F_{FBMm}$ represents the predicting defective ratio of the arbitrary fail bit mode, and $f_{FBMm}$ represents the actual fail bit defective ratio. As a method of calculating $D0_{FBMm\text{-}fbmm}$, an arbitrary weight coefficient "$w_{Layern}$" can be set for each process as shown in Expression (6), and also arbitrary coefficients "k" and "k'" can be set as shown in Expression (7).

[Expression 6]

$$D0_{FBMm\text{-}fbmm} = -\ln((1-F_{FBMm})/(1-f_{FBMm}))/\Sigma w_{Layern} \times Ac_{FBMm\_Layern}$$

In case of $(1-F_{FBMm})/(1-f_{FBMm}) \leq 1$ $$D0_{FBM\text{-}fbmm} = -\ln((1-f_{FBMm})/(1-F_{FBMm}))/\Sigma w_{Layern} \times Ac_{FBMm\_Layern}$$

In case of $(1-F_{FBMm})/(1-f_{FBMm}) > 1$ \hfill (6)

[Expression 7]

$$D0_{FBMm\text{-}fbmm} = -\ln((1-F_{FBMm})/(1-k \times f_{FBMm}))/\Sigma w_{Layern} \times Ac_{FBMm\_Layern}$$

In case of $(1-F_{FBMm})/(1-k \times f_{FBMm}) \leq 1$ $$D0_{FBMm\text{-}fbmm} = -\ln((1-k' \times f_{FBMm})/(1-F_{FBMm}))/\Sigma w_{Layern} \times Ac_{FBMm\_Layern}$$

In case of $(1-F_{FBMm})/(1-k' \times f_{FBMm}) > 1$ \hfill (7)

In the example of 12101 of FIG. 4, the fail bit mode D (FBMD) is selected as the fail bit mode whose gap is the largest. In this fail bit mode D, since the predicting defective ratio is larger than the actual defective ratio, the initial values of the number of foreign substances of the process Y (LayerY1) and the process Z (LayerZ1) where the defect occurs in the fail bit mode D are changed by using Expression (8) to the number of foreign substances by which the actual defective ratio is matched with the predicting defective ratio.

[Expression 8]

$$D0_{LayerY1} = -1n(\exp(-D0_{LayerY0} \times Ac_{FBMD\_LayerY})/\exp(-D0_{FBMm\text{-}fbmD} \times w_{LayerY} \times Ac_{FBMD\_LayerY}))/Ac_{FBMD\_LayerY}$$

$$D0_{LayerZ1} = -1n(\exp(-D0_{LayerZ0} \times Ac_{FBMD\_LayerZ})/\exp(-D0_{FBMm\text{-}fbmD} \times w_{LayerZ} \times Ac_{FBMD\_LayerZ}))/Ac_{FBMD\_LayerZ} \quad (8)$$

Here, "$D0_{LayerY0}$" and "$D0_{LayerZ0}$" represent respective initial values of the numbers of foreign substances of the processes Y and Z, "$D0_{FBMD\text{-}fbmD}$" represents the number of foreign substances with the degree of the gap of the fail bit mode D calculated by Expression (5), (6), or (7) "$Ac_{FBMD\_LayerY}$" represents the critical area of the process Y of the fail bit mode D, "$Ac_{FBMD\_LayerZ}$" represents the critical area of the process Z of the fail bit mode D, and "$w_{layerY}$" and "$w_{layerZ}$" represent respective weight coefficients of the processes Y and Z which are set by Expression (6) or (7) and are set to 1 when Expression (5) is used. In Expression (8), a constraint condition is that the number of foreign substances D0 of all processes is a positive value, and, if the number is a negative value, the following processes such as (i) and (ii) can be considered.

(i) The repetitive calculation is ended when the number becomes the negative value.

(ii) The matching to a fail bit mode whose gap is the second largest is performed, and, if the number of foreign substances is the negative value, the matching to a fail bit mode whose gap is the third largest, so that a fail bit mode whose gap is the largest among the fail bit modes whose number of foreign substances is the positive value is calculated. If there is a process that the number of foreign substances is the negative value even using any fail bit mode, the repetitive calculation is ended.

By changing the numbers of foreign substances of the processes Y and Z where the defect occurs in the fail bit mode D, the defective ratios of the processes Y and Z in the other modes A, B, and C are also changed. Therefore, as illustrated in "12102", the gaps in all fail bit modes between the predicting defective ratio and the actual defective ratio are changed, and the fail bit mode B is newly selected as the fail bit mode whose gap is the largest. In the fail bit mode B (FBMB), since the actual defective ratio is larger than the predicting defective ratio, the numbers of foreign substances "$D0_{LayerX}$", "$D0_{LayerY}$", and "$D0_{LayerZ}$" of the respective processes X, Y, and Z, where the defect occurs in the fail bit mode B, are changed by using Expression (9).

[Expression 9]

$$D0_{LayerX1} = -1n(\exp(-D0_{FBMB\text{-}fbmB} \times w_{LayerX} \times Ac_{FBMB\_LayerX}) \times \exp(-D0_{LayerX0} \times Ac_{FBMB\_LayerX}))/Ac_{FBMB\_LayerX}$$

$$D0_{LayerY2} = -1n(\exp(-D0_{FBMB\text{-}fbmB} \times w_{LayerY} \times Ac_{FBMB\_LayerY})) \times \exp(-D0_{LayerY1} \times Ac_{FBMB\_LayerY})/Ac_{FBMB\_LayerY}$$

$$D0_{LayerZ2} = -1n(\exp(-D0_{FBMB\text{-}fbmB} \times w_{LayerZ} \times Ac_{FBMB\_LayerZ}) \times \exp(-D0_{LayerZ1} \times Ac_{FBMB\_LayerZ}))/Ac_{FBMB\_LayerZ} \quad (9)$$

Here, "$D0_{LayerX1}$", "$D0_{LayerY2}$", and "$D0_{LayerZ2}$" re represent the numbers of foreign substances of the respective processes X, Y, and Z obtained after the matching, "$D0_{LayerX0}$" represents the initial value of the number of foreign substances of the process X, "$D0_{LayerY1}$" and "$D0_{LayerZ1}$" represent the numbers of foreign substances of the respective processes Y and Z obtained after the matching to the fail bit mode D calculated by Expression (8), "$D0_{FBMB\text{-}fbmB}$" represents the number of foreign substances with the degree of the gap in the fail bit mode B calculated by Expression (5), (6), or (7), and "$Ac_{FBMB\_LayerX}$", "$Ac_{FBMB\_LayerY}$", and "$Ac_{FBMB\_LayerZ}$" represent the critical areas of the respective processes X, Y, and Z in the fail bit mode B. In this manner, the number of foreign substances is repeatedly matched (from "12101" to "12103") to satisfy previously-set convergence condition (such as the setting number of times and a threshold of the degree of the gap). Then, by calculating a total value of the gaps in each fail bit mode between the predicting defective ratio and the actual defective ratio calculated by substituting, into Expression (1), the number of foreign substances calculated every time of the repetitive matching, selecting $D0_{Layern}$ of each process whose gap is the smallest, and substituting $D0_{Layern}$ into Expression (10), a foreign-substance defective ratio "$F_{Layern}$" of each process can be calculated, and further, the characteristic defect is quantified as the difference between the predicting defective ratio and the actual defective ratio using the number of foreign substances $D0_{Layern}$ ("12104").

[Expression 10]

$$\begin{bmatrix} Ac_{FBM1\_Layern} \\ Ac_{FBM2\_Layern} \\ Ac_{FBM3\_Layern} \\ \vdots \\ Ac_{FBMm\_Layern} \end{bmatrix} [D0_{Layern}] = -\ln(1 - F_{Layern}) \quad (10)$$

Here, "$Ac_{FBMm\_Layern}$" represents the critical area of an arbitrary process "n" of each fail bit mode "m", "$D0_{Layern}$" represents the number of foreign substances of the arbitrary process "n", and "$F_{Layern}$" represents the foreign-substance defective ratio of the arbitrary process "n".

When the fail-bit defective mode containing many characteristic defects is unknown, firstly, the number of foreign substances D0 of each process is estimated except for the fail bit mode A (12101 and 12102), and next, the number of foreign substances D0 of each process is estimated except for the fail bit mode B (12103), so that the number of foreign substances is calculated as changing one or a plurality of fail bit modes to be excepted, each number of foreign substances is substituted into Expression (1) to calculate the predicting defective ratio of each fail bit mode, and a combination by which the total value of the gaps in other fail bit modes than the excepted fail bit mode between the actual defective ratio and the predicting defective ratio is the smallest is selected.

FIG. 5 shows a flowchart of the first embodiment for quantifying the characteristic defective ratio and the foreign-substance defective ratio of each process. This flow for quantifying the characteristic defective ratio and the foreign-substance defective ratio of each process shows a process mainly using the predicting unit 121 for the characteristic defective ratio and the foreign-substance defective ratio of each process achieved by executing a defective ratio predicting program contained in the managing program.

[Step 200 in FIG. 5] First, in setting the calculation parameter, a result of the fail bit analysis of an analytical-objective wafer (a lot average value or a specific-period average value may be used) is selected from the storage region 114 for product/TEG test result. Also, from the storage region 112 for the critical area, the critical area $Ac_{FBMm\_Layern}$ of each process and each fail bit mode in an objective product is obtained. Further, from the storage region 113 for the process-diagnosis TEG result, the initial value of the average number of foreign substances $D0_{Layern}$ of each process is obtained. The initial value $D0_{Layern}$ may be set to an arbitrary value.

[Step 201 in FIG. 5] The critical area $Ac_{FBMm\_Layern}$ and the number of foreign substances $D0_{Layern}$ obtained at the above-described step 200 are substituted into Expression (1) to calculate (predict) the defective ratio of each fail bit mode.

[Step 202 in FIG. 5] Among the actual defective ratios of the respective fail bit modes obtained at the above-described step 200, the fail bit mode where the characteristic defect occurs is selected. If the fail bit mode where the characteristic defect occurs is previously known, the fail bit mode is directly specified. If it is unknown, an arbitrary fail bit mode to be the object is automatically selected.

[Step 203 in FIG. 5] In other fail bit modes except for that at the above-described step 202, the total value of the gaps between the fail-bit actual defective ratio (actual value) at the above-described step 200 and the fail-bit predicting defective ratio (predicting value) at the above-described step 201 is calculated and stored in the storage region 115 for the analysis result.

[Step 204 in FIG. 5] In other fail bit modes except for that at the above-described step 202, the fail bit mode whose gap between the actual defective ratio and the predicting defective ratio is the largest is selected. The fail bit mode whose gap in the defective ratio is the largest or the fail bit mode whose gap in the number of foreign substances $D0_{FBMm\_fbmm}$ calculated by Expression (5), (6), or (7) is the largest is selected in some cases.

[Step 205 in FIG. 5] In the fail bit mode selected at the above-described step 204, the number of foreign substances of the corresponding process is calculated by using Expression (8) or (9) so that the actual defective ratio and the predicting defective ratio are matched to each other.

[Step 206 in FIG. 5] It is judged whether or not all of the numbers of foreign substances $D0_{Layern}$ of the corresponding process calculated at the above-described step 205 are positive values. If they are the positive values (Y), the process proceeds to step 207. If they are not the positive values (N), the process proceeds to the process (i) in which the repetitive calculation is ended and the process proceeds to step 210. Instead of the process (i), there is the method (ii) in which, the process returns to step 204, the fail bit mode whose gap between the predicting defective ratio and the actual defective ratio is the second largest is selected, the steps 205 and 206 are performed, and, if the number of foreign substances $D0_{Layern}$ is the negative value even using any fail bit mode, the process proceeds to step 210.

[Step 207 in FIG. 5] The number of foreign substances calculated at the above-described step 205 is substituted into Expression (1) to recalculate the predicting defective ratios in all fail bit modes.

[Step 208 in FIG. 5] Among the predicting defective ratios of the respective fail bit modes recalculated at the above-described step 207, using the predicting defective ratios in the other fail bit modes except for the fail bit mode where the characteristic defect occurs and which is specified at the above-described step 202, the total value of the gaps between the predicting defective ratio and the actual defective ratio is calculated and stored in the storage region 115 for the analysis result.

[Step 209 in FIG. 5] It is judged whether or not the process has been completed to satisfy the previously-set threshold with the degree of the gap (or the number of times of repeat) from the above-described step 204 to step 208. If the process has been completed (Y), the process proceeds to step 210. If the process has not been completed yet (N), step 204 to step 209 are repeated.

[Step 210 in FIG. 5] When the fail bit mode to be the object for the characteristic defect is automatically determined at the above-described step 202, it is judged whether or not all calculations for the arbitrary objective fail bit mode have been completed. If they have been completed (Y), the process proceeds to step 211. If they have not been completed yet (N), the process returns to step 202 to select a next objective fail bit mode, and step 203 to step 210 are repeated.

[Step 211 in FIG. 5] Among the total values of the gaps between the predicting defective ratio and the actual defective ratio stored at the above-described steps 203 and 208, the number of foreign substances of each process whose gap is the smallest is selected and stored in the storage region 115 for the analysis result.

[Step 212 in FIG. 5] The number of foreign substances of each process selected at the above-described step 211 is substituted into Expression (10) to calculate the foreign-substance defective ratio of each process. Also, by using the number of foreign substances of each process selected at the above-described step 211, the fail-bit-mode defective ratio to be the object for the characteristic defect specified at step 202 is calculated. And, the characteristic defective ratio is calculated as the gap between the fail-bit-mode defective ratio and the actual defective ratio, and these results are stored in the storage region 115 for the analysis result.

[Step 213 in FIG. 5] It is judged whether or not the calculations for all analytical-objective wafers have been completed. If they have been completed (Y), the process is ended. If they have not been completed yet (N), the process returns to step 200 to select a next analytical-objective wafer, and step 201 to step 213 are repeated.

<Second Embodiment>

Figure 6:
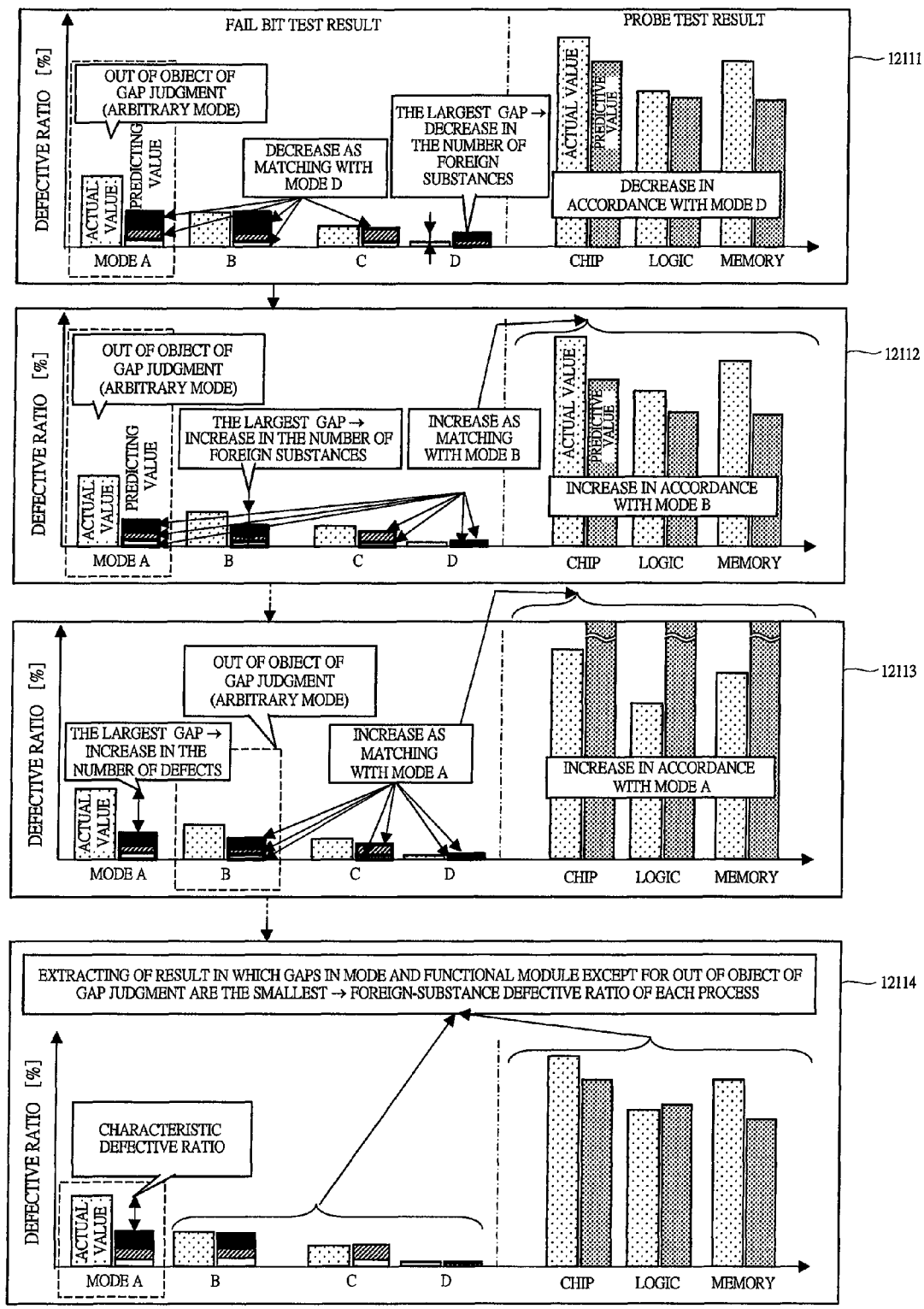
FIG. 6 is a schematic diagram illustrating a method of calculating a characteristic defective ratio and a foreign-substance defective ratio of each process in an embodiment (second embodiment) of the present invention.
Figure 7:
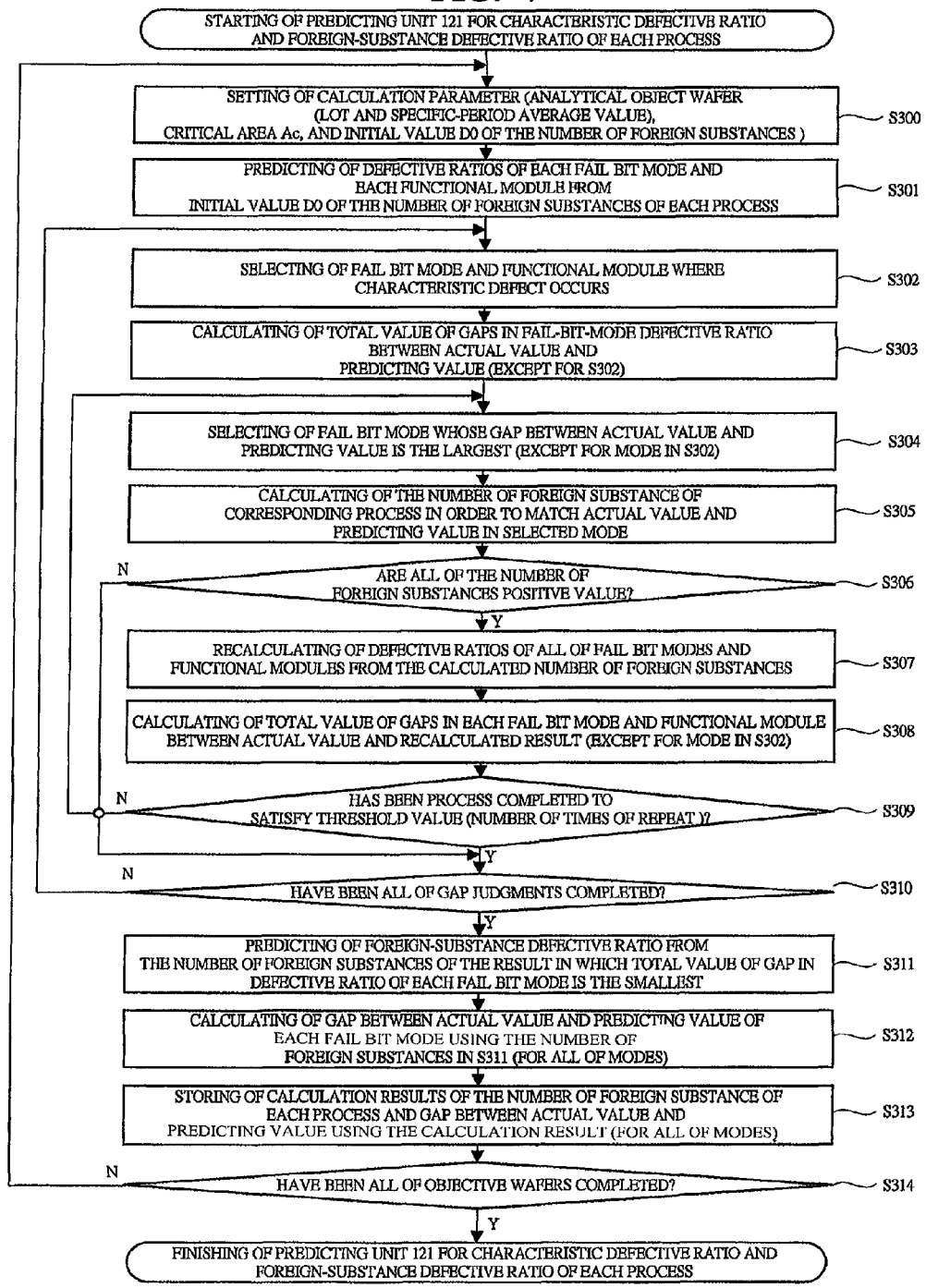
FIG. 7 is a flowchart showing a method of calculating the characteristic defective ratio and the foreign-substance defective ratio of each process in the embodiment (the second embodiment) of the present invention.

A second embodiment using the above-described managing system 100 for the semiconductor manufacturing apparatus illustrated in FIG. 1 is described based on FIGS. 6 and 7.

The second embodiment for quantifying the characteristic defective ratio and the foreign-substance defective ratio of each process is described with reference to FIG. 6. First, among other fail bit modes (modes B, C, and D in FIG. 6) except for a fail bit mode where the characteristic defect occurs (mode A in FIG. 6), the fail bit mode D whose gap between the actual defective ratio and the predicting defective ratio is the largest is selected, and the number of foreign substances of a related process is matched to that of the fail bit mode D. At this time, in the second embodiment, by using the number of foreign substances $D0_{Layern}$ of each process, yields for functional modules such as a logic unit and a memory unit and the entire chip are also predicted, and each result of these predictions is also compared with each actual defective ratio of the entire chip, the logic unit, and the memory unit.

In this manner, for example, even if the gap in each fail bit mode between the actual defective ratio and the predicting defective ratio is small, when the predicting defective ratio of the logic unit in which the characteristic defect is not to occur is extremely larger than its actual defective ratio as illustrated in "12113", accuracy of the estimation of the number of foreign substances $D0_{Layern}$ may have a problem, so that validity of the number of foreign substance $D0_{Layern}$ calculated by using the fail bit mode can be checked, and therefore, accuracy of the prediction can be improved. In this manner, the numbers of foreign substances are matched by using the fail bit mode not containing the characteristic defect (from 12111 to 12113). From these results, as illustrated in 12114, a defective ratio obtained when the gaps in each fail bit mode not containing the characteristic defect and each functional module not containing the characteristic defect between the actual defective ratio and the predicting defective ratio are the smallest is taken as the foreign-substance defective ratio, and the gap between the foreign-substance defective ratio and the actual defective ratio is taken as the characteristic defective ratio.

FIG. 7 shows a flowchart of the second embodiment for quantifying the characteristic defective ratio and the foreign-substance defective ratio of each process. This flow for quantifying the characteristic defective ratio and the foreign-substance defective ratio of each process shows a process mainly using the predicting unit 121 for the characteristic defective ratio and the foreign-substance defective ratio of each process.

[Step 300 in FIG. 7] First, in setting the calculation parameter, a fail-bit analysis result of an analytical-objective wafer (a lot average value or a specific-period average value may be used) and a probe test result of each functional module such as the entire chip, the logic unit, and the memory unit are selected from the storage region 114 for product/TEG test result. As the test result, a defective ratio of each defective category such as a functional defect may be used, or a plurality of actual defective ratios obtained by changing a test condition such as a power-supply voltage and a temperature may be compared with the test result. In these cases, it can be specified in which defective category or in which test condition and to what degree (how many) the characteristic defect occurs, and therefore, these cases are effective for the identification of the cause of the characteristic defect. Next, from the storage region 112 for the critical area, the critical area $Ac_{FBMm\_Layern}$ of each process in each fail bit mode and a critical area $Ac_{mod.i\_Layern}$ of each process in each functional module such as the entire chip, the logic unit, and the memory unit in the objective product are obtained. Further, from the storage region 113 for the process-diagnosis TEG result, an initial value of an average number of foreign substances $D0_{Layern}$ of each process is obtained. The initial value of $D0_{Layern}$ may be set to an arbitrary value.

[Step 301 in FIG. 7] The critical area $Ac_{FBMm\_Layern}$ and the number of foreign substances $D0_{Layern}$ obtained at the above-described step 300 are substituted into Expression (1) to predict the defective ratio of each fail bit mode. Further, by using Expression (11), the defective ratio of each functional module such as the entire chip, the logic unit, and the memory unit is calculated.

[Expression 11]

$$\begin{bmatrix} Ac_{mod.i\_Layer1} \\ Ac_{mod.i\_Layer2} \\ Ac_{mod.i\_Layer3} \\ \vdots \\ Ac_{mod.i\_Layern} \end{bmatrix} [D0_{Layer1} \quad D0_{Layer2} \quad D0_{Layer3} \quad \dots \quad D0_{Layern}] = \\ -\ln(1 - F_{mod.i}) \quad (11)$$

Here, "$Ac_{mod.i\_Layern}$" represents the critical area of each process in each functional module, "$D0_{Layern}$" represents the number of foreign substances of each process, and "$F_{mod.i}$" represents the defective ratio of each functional module.

[Step 302 in FIG. 7] Among the actual defective ratios of the respective fail bit modes obtained at the above-described step 300, the fail bit mode and functional module where the characteristic defect occurs are selected. If the fail bit mode where the characteristic defect occurs is previously known, the fail bit mode is directly specified. If it is unknown, an arbitrary fail bit mode to be the object is automatically selected.

[Step 303 in FIG. 7] In other fail bit modes except for that at the above-described step 302, the total value of the gap between the fail-bit actual defective ratio (actual value) at the above-described step 300 and the fail-bit predicting defective ratio (predicting value) at the above-described step 301 and a total value of a gap between an actual defective ratio and each defective ratio of other functional modules except for the functional module containing the characteristic defect specified at the above-described step 302 are calculated and stored in the storage region 115 for the analysis result as an initial-value gap.

[Step 304 in FIG. 7] In other fail bit modes except for that at the above-described step 302, the fail bit mode whose gap between the actual defective ratio and the predicting defective ratio is the largest is selected. The fail bit mode whose gap in the defective ratio is the largest or the fail bit mode whose gap in the number of foreign substances $D0_{FBMm-fbmm}$ calculated by Expression (5), (6), or (7) is the largest is selected in some cases.

[Step 305 in FIG. 7] In the fail bit mode selected at the above-described step 304, the number of foreign substances of the corresponding process is calculated by using Expression (8) or (9) so that the actual defective ratio and the predicting defective ratio are matched to each other.

[Step 306 in FIG. 7] It is judged whether or not all of the numbers $D0_{Layern}$ of foreign substances of the corresponding process calculated at the above-described step 305 are positive values. If they are the positive values (Y), the process proceeds to step 307. If they are not the positive values (N), the process (i) in which is the repetitive calculation is ended, and the process proceeds to step 310. Instead of the process (i), there is the method (ii) in which, the process returns to step 304, the fail bit mode whose gap between the predicting defective ratio and the actual defective ratio is the second largest is selected, the steps 305 and 306 are performed, and, if the number of foreign substances $D0_{Layern}$ is the negative value even using any fail bit mode, the process proceeds to step 310.

[Step 307 in FIG. 7] By using the number of foreign substances calculated at the above-described step 305, the predicting defective ratios of all fail bit modes and the defective ratios of the functional modules such as the entire chip, the logic unit, and the memory unit are recalculated.

[Step 308 in FIG. 7] Among the predicting defective ratios recalculated at the above-described step 307, a total value of the gaps between the predicting defective ratio and the actual defective ratio in other fail bit modes except for the fail bit mode containing the characteristic defect specified at the above-described step 302 and a total value of the gaps between the predicting defective ratio and the actual defective ratio in other functional modules except for the functional module containing the characteristic defect specified at the above-described step 302 are calculated and stored in the storage region 115 for the analysis result.

[Step 309 in FIG. 7] It is judged whether or not the process has been completed to satisfy the previously-set number of times of repeat (or threshold condition) from the above-described step 304 to step 308. If the process has been completed (Y), the process proceeds to step 310. If the process has not been completed yet (N), step 304 to step 309 are repeated.

[Step 310 in FIG. 7] When the fail bit mode to be the object for the characteristic defect is automatically determined at the above-described step 302, it is judged whether or not all calculations for the arbitrary objective fail bit mode have been completed. If they have been completed (Y), the process proceeds to step 311. If they have not been completed yet (N), the process returns to step 302 to select a next objective fail bit mode, and step 303 to step 310 are repeated.

[Step 311 in FIG. 7] Among the total values of the gaps between the predicting defective ratio and the actual defective ratio stored at the above-described steps 303 and 308, the case whose gap is the smallest is selected, and the number of foreign substances of each process in the case is substituted into Expression (10) to predict the foreign-substance defective ratio of each process.

[Step 312 in FIG. 7] By using the number of foreign substances of each process selected at the above-described step 311, the predicting defective ratios of all fail bit modes are calculated, and the characteristic defect is calculated as the gap between the predicting defective ratio and the actual defective ratio.

[Step 313 in FIG. 7] A calculation result of the number of foreign substances of each process calculated at the above-described step 311 and the characteristic defective ratio as the gap between the actual defective ratio and the predicting defective ratio calculated at the above-described step 312 are stored in the storage region 115 for the analysis result.

[Step 314 in FIG. 7] It is judged whether or not the calculations for all analytical-objective wafers have been completed. If they have been completed (Y), the process is ended. If they have not been completed yet (N), the process returns to step 300 to select a next analytical-objective wafer, and step 301 to step 313 are repeated.

<Third Embodiment>

Figure 8:
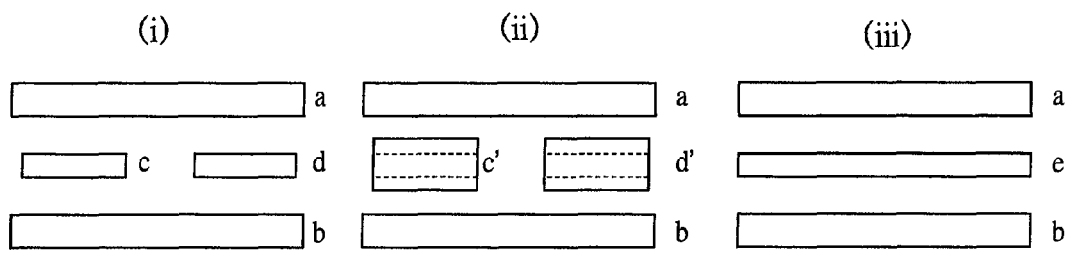
FIG. 8 is a schematic diagram illustrating an example of a functional module with a different dimension or a functional module with a different layout in an embodiment (the third embodiment) of the present invention.

A third embodiment using the above-described managing system 100 for the semiconductor manufacturing apparatus illustrated in FIG. 1 is described based on FIG. 8.

According to the present invention, in the method of calculating the characteristic defective ratio and the foreign-substance defective ratio of each process described above in the first and second embodiments, for an objective memory device, layouts with different dimensions from each other as illustrated in a diagram "c" of (i) and a diagram "c'" of (ii) or a diagram "d" of (i) and a diagram "d'" of (ii) in FIG. 8, or a plurality of memories with different layout shapes from each other as illustrated in (iii) in FIG. 8 can be also used. In this case, as shown in Expression (12), relations between critical areas "$Ac_{Mem.i\_FBMm\_Layern}$", "$Ac_{Mem.ii\_FBMm\_Layern}$", and "$Ac_{Mem.iii\_FBMm\_Layern}$" and actual fail-bit defective ratios "$F_{Mem.i\_FBMm}$", "$F_{Mem.ii\_FBMm}$", and "$F_{Mem.iii\_FBMm}$" in respective memories are established, and therefore, the number of parameters usable for calculation of the number of foreign substances $D0_{Layern}$ of each process is increased, so that accuracy of the estimation of the number of foreign substances can be improved.

[Expression 12]

-continued $$\begin{bmatrix} Ac_{Mem.i\_FBM1\_Layer1} & Ac_{Mem.i\_FBM1\_Layer2} & Ac_{Mem.i\_FBM1\_Layer3} & \vdots & Ac_{Mem.i\_FBM1\_Layern} \\ Ac_{Mem.i\_FBM2\_Layer1} & Ac_{Mem.i\_FBM2\_Layer2} & Ac_{Mem.i\_FBM2\_Layer2} & \vdots & Ac_{Mem.i\_FBM2\_Layern} \\ Ac_{Mem.i\_FBM3\_Layer1} & Ac_{Mem.i\_FBM3\_Layer2} & Ac_{Mem.i\_FBM3\_Layer3} & \vdots & Ac_{Mem.i\_FBM3\_Layern} \\ \vdots & \vdots & \vdots & \vdots & \vdots \\ Ac_{Mem.i\_FBMm\_Layer1} & Ac_{Mem.i\_FBMm\_Layer2} & Ac_{Mem.i\_FBMm\_Layer3} & \vdots & Ac_{Mem.i\_FBMm\_Layern} \\ Ac_{Mem.ii\_FBM1\_Layer1} & Ac_{Mem.ii\_FBM1\_Layer2} & Ac_{Mem.ii\_FBM1\_Layer3} & \vdots & Ac_{Mem.ii\_FBM1\_Layern} \\ Ac_{Mem.ii\_FBM2\_Layer1} & Ac_{Mem.ii\_FBM2\_Layer2} & Ac_{Mem.ii\_FBM2\_Layer3} & \vdots & Ac_{Mem.ii\_FBM2\_Layern} \\ Ac_{Mem.ii\_FBM2\_Layer1} & Ac_{Mem.ii\_FBM3\_Layer2} & Ac_{Mem.ii\_FBM3\_Layer3} & \vdots & Ac_{Mem.ii\_FBM3\_Layern} \\ \vdots & \vdots & \vdots & \vdots & \vdots \\ Ac_{Mem.ii\_FBMm\_Layer1} & Ac_{Mem.ii\_FBMm\_Layer2} & Ac_{Mem.ii\_FBMm\_Layer2} & \vdots & Ac_{Mem.ii\_FBMm\_Layern} \\ Ac_{Mem.iii\_FBM1\_Layer1} & Ac_{Mem.iii\_FBM1\_Layer2} & Ac_{Mem.iii\_FBM1\_Layer3} & \vdots & Ac_{Mem.iii\_FBM1\_Layern} \\ Ac_{Mem.iii\_FBM2\_Layer1} & Ac_{Mem.iii\_FBM2\_Layer2} & Ac_{Mem.iii\_FBM2\_Layer3} & \vdots & Ac_{Mem.iii\_FBM2\_Layern} \\ Ac_{Mem.iii\_FBM3\_Layer1} & Ac_{Mem.iii\_FBM3\_Layer2} & Ac_{Mem.iii\_FBM3\_Layer3} & \vdots & Ac_{Mem.iii\_FBM3\_Layern} \\ \vdots & \vdots & \vdots & \vdots & \vdots \\ Ac_{Mem.iii\_FBMm\_Layer1} & Ac_{Mem.iii\_FBMm\_Layer2} & Ac_{Mem.iii\_FBMm\_Layer3} & \vdots & Ac_{Mem.iii\_FBMm\_Layern} \end{bmatrix} \quad (12)$$

$$\begin{bmatrix} D0_{Layer1} \\ D0_{Layer2} \\ D0_{Layer3} \\ \vdots \\ D0_{Layern} \\ D0_{Layer1} \\ D0_{Layer2} \\ D0_{Layer3} \\ \vdots \\ D0_{Layern} \\ D0_{Layer1} \\ D0_{Layer2} \\ D0_{Layer3} \\ \vdots \\ D0_{Layern} \end{bmatrix} = \begin{bmatrix} -\ln(1 - F_{Mem.i\_FBM1}) \\ -\ln(1 - F_{Mem.i\_FBM2}) \\ -\ln(1 - F_{Mem.i\_FBM3}) \\ \vdots \\ -\ln(1 - F_{Mem.i\_FBMm}) \\ -\ln(1 - F_{Mem.ii\_FBM1}) \\ -\ln(1 - F_{Mem.ii\_FBM2}) \\ -\ln(1 - F_{Mem.ii\_FBM3}) \\ \vdots \\ -\ln(1 - F_{Mem.ii\_FBMm}) \\ -\ln(1 - F_{Mem.iii\_FBM1}) \\ -\ln(1 - F_{Mem.iii\_FBM2}) \\ -\ln(1 - F_{Mem.iii\_FBM3}) \\ \vdots \\ -\ln(1 - F_{Mem.iii\_FBMm}) \end{bmatrix}$$

<Fourth Embodiment>

A fourth embodiment using the managing system 100 for the semiconductor manufacturing apparatus illustrated in FIG. 1 above is described.

In the above-described first to third embodiments, in the fail bit mode not containing the characteristic defect, the number of foreign substances whose error between the actual defective ratio and the predicting defective ratio in each fail bit mode is the smallest is calculated as searching within the range of the condition in which all numbers of foreign substances are positive values. However, for this calculation of the foreign-substance defective ratio, for example, a method of calculating the number of foreign substances $D0_{Layern}$ of each process so that the error "e" between the actual defective ratio and the predicting defective ratio is the smallest by using a linear programming method as shown in Expression (13) or a method of least-square method, multiple regression analysis, or inverse matrix calculation, can be also used.

[Expression 13]

Minimization  (13)

$$e = \begin{bmatrix} Ac_{FBM1\_Layer1} & Ac_{FBM1\_Layer2} & Ac_{FBM1\_Layer3} & \vdots & Ac_{FBM1\_Layern} \\ Ac_{FBM2\_Layer1} & Ac_{FBM2\_Layer2} & Ac_{FBM2\_Layer3} & \vdots & Ac_{FBM2\_Layern} \\ Ac_{FBM3\_Layer1} & Ac_{FBM3\_Layer2} & Ac_{FBM3\_Layer3} & \vdots & Ac_{FBM3\_Layern} \\ \vdots & \vdots & \vdots & \vdots & \vdots \\ Ac_{FBMm\_Layer1} & Ac_{FBMm\_Layer2} & Ac_{FBMm\_Layer3} & \vdots & Ac_{FBMm\_Layern} \end{bmatrix}$$

$$\begin{bmatrix} D0_{Layer1} \\ D0_{Layer2} \\ D0_{Layer3} \\ \vdots \\ D0_{Layern} \end{bmatrix} - \begin{bmatrix} -\ln(1 - F_{FBM1}) \\ -\ln(1 - F_{FBM2}) \\ -\ln(1 - F_{FBM3}) \\ \vdots \\ -\ln(1 - F_{FBMm}) \end{bmatrix}$$

-continued

Constraint condition $$e' \geq \begin{bmatrix} Ac_{FBM1\_Layer1} & Ac_{FBM1\_Layer2} & Ac_{FBM1\_Layer3} & \vdots & Ac_{FBM1\_Layern} \\ Ac_{FBM2\_Layer1} & Ac_{FBM2\_Layer2} & Ac_{FBM2\_Layer3} & \vdots & Ac_{FBM2\_Layern} \\ Ac_{FBM3\_Layer1} & Ac_{FBM3\_Layer2} & Ac_{FBM3\_Layer3} & \vdots & Ac_{FBM3\_Layern} \\ \vdots & \vdots & \vdots & \vdots & \vdots \\ Ac_{FBMm\_Layer1} & Ac_{FBMm\_Layer2} & Ac_{FBMm\_Layer3} & \vdots & Ac_{FBMm\_Layern} \end{bmatrix} \begin{bmatrix} D0_{Layer1} \\ D0_{Layer2} \\ D0_{Layer3} \\ \vdots \\ D0_{Layern} \end{bmatrix} - \begin{bmatrix} -\ln(1-F_{FBM1}) \\ -\ln(1-F_{FBM2}) \\ -\ln(1-F_{FBM3}) \\ \vdots \\ -\ln(1-F_{FBMm}) \end{bmatrix}$$

$$e' \geq -\begin{bmatrix} Ac_{FBM1\_Layer1} & Ac_{FBM1\_Layer2} & Ac_{FBM1\_Layer3} & \vdots & Ac_{FBM1\_Layern} \\ Ac_{FBM2\_Layer1} & Ac_{FBM2\_Layer2} & Ac_{FBM2\_Layer3} & \vdots & Ac_{FBM2\_Layern} \\ Ac_{FBM3\_Layer1} & Ac_{FBM3\_Layer2} & Ac_{FBM3\_Layer3} & \vdots & Ac_{FBM3\_Layern} \\ \vdots & \vdots & \vdots & \vdots & \vdots \\ Ac_{FBMm\_Layer1} & Ac_{FBMm\_Layer2} & Ac_{FBMm\_Layer3} & \vdots & Ac_{FBMm\_Layern} \end{bmatrix} \begin{bmatrix} D0_{Layer1} \\ D0_{Layer2} \\ D0_{Layer3} \\ \vdots \\ D0_{Layern} \end{bmatrix} + \begin{bmatrix} -\ln(1-F_{FBM1}) \\ -\ln(1-F_{FBM2}) \\ -\ln(1-F_{FBM3}) \\ \vdots \\ -\ln(1-F_{FBMm}) \end{bmatrix}$$

$$\begin{bmatrix} D0_{Layer1} \\ D0_{Layer2} \\ D0_{Layer3} \\ \vdots \\ D0_{Layern} \end{bmatrix} \geq 0$$

<Fifth Embodiment>

A fifth embodiment using the managing system 100 for the semiconductor manufacturing apparatus illustrated in FIG. 1 above is described based on FIGS. 9, 10, 11, and 12.

Figure 9:
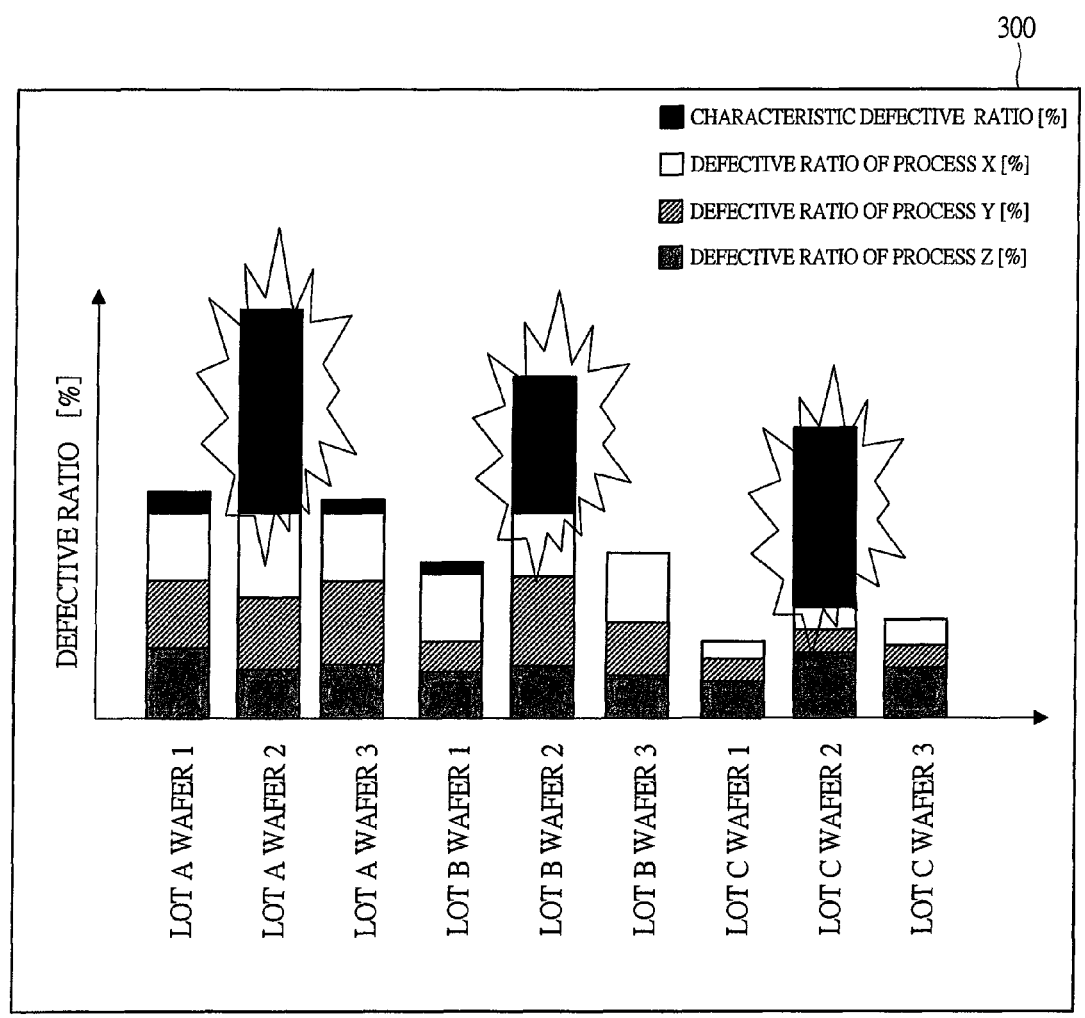
FIG. 9 is a schematic diagram illustrating a graph showing the calculation results of a characteristic defective ratio and a foreign-substance defective ratio of each process and each wafer in an embodiment (the fifth embodiment) of the present invention.

The characteristic defective ratio and the foreign-subject defective ratio of each process calculated for each wafer based on the above-described first to fourth embodiments can be displayed as, for example, a graph 300 as illustrated in FIG. 9 on the display/output unit 140. In a result of this graph 300 in an example of the characteristic defective ratio and the defective ratios of the processes X, Y, and Z in each of wafers 1, 2, and 3 of lots A, B, and C, it can be confirmed that the characteristic defective ratio is high in the wafer 2 of each lot. Therefore, by obtaining manufacturing histories of all wafers displayed as the graph 300 from the storage region 111 for the manufacturing history and comparing an apparatus history of the wafer 2 with those of other wafers in the comparing unit 122 for the wafer history, suspected-causes of the characteristic defect can be narrowed down to an apparatus, a chamber, a manufacturing condition, or a characteristic manufacturing parameter used commonly for only the wafer 2.

Figure 10:
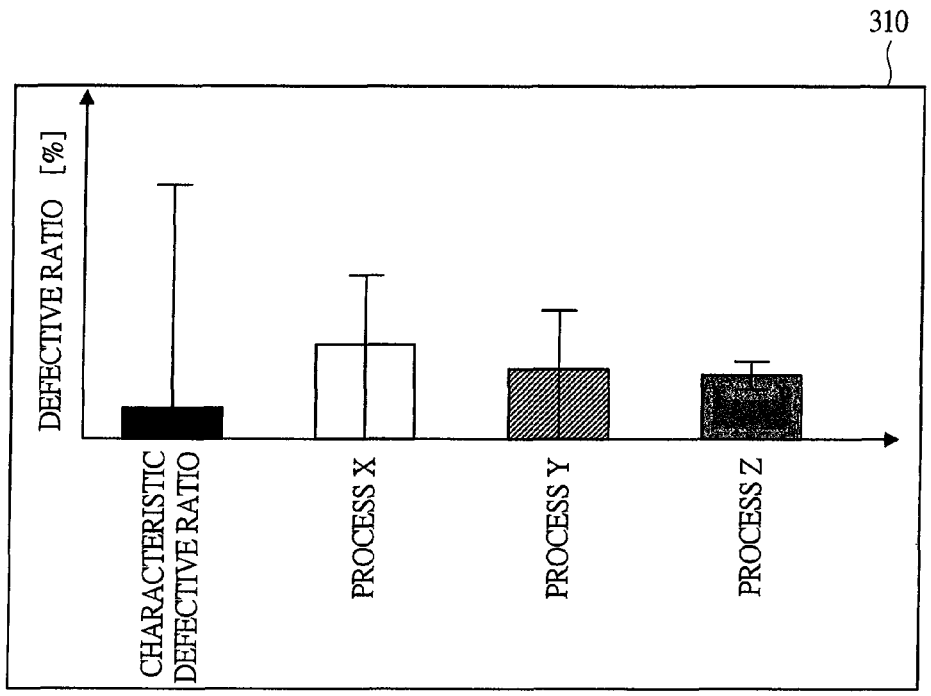
FIG. 10 is a schematic diagram illustrating a graph showing calculation results of an average value and a standard deviation of a characteristic defective ratio and a foreign-substance defective ratio of each process in an arbitrary wafer in the embodiment (the fifth embodiment) of the present invention.

Also, a graph 310 as illustrated in FIG. 10 can be displayed on the display/output unit 140. In a result of this graph 310 in the characteristic defective ratio and the defective ratios of the processes X, Y, and Z calculated for each of the wafers 1, 2, and 3 of the lots A, B, and C in the graph 300, respective average values and standard deviations are illustrated. Since an average characteristic defective ratio and defective ratio of each process in an arbitrary wafer and a defect with large variations can be specified, and therefore, a defect to be intensively acted on can be extracted, and a ratio of occurrence of the defect for each wafer can be confirmed.

When the suspected-causes of the characteristic defect are narrowed down to the apparatus, the chamber, the manufacturing condition, or the characteristic manufacturing parameter used commonly for only the wafer 2 in FIG. 9, for example, a graph 320 as illustrated in FIG. 11 can be also outputted on the display/output unit 140. In the example of FIG. 11, when a wafer 1 is processed in a chamber "A" of an apparatus "a-1" in a process "X"_treatment "a" and a chamber "A" of an apparatus "b-1" in a process "X"_treatment "b", a wafer 2 is processed in a chamber "B" of the apparatus "a-1" in the process "X"_treatment "a" and a chamber "A" of the apparatus "b-1" in the process "X"_treatment "b", and a wafer 3 is processed in the chamber "A" of the apparatus "a-1" in the process "X"_treatment "a" and a chamber "C" of an apparatus "b-2" in the process "X"_treatment "b", the suspected-cause of the characteristic defect can be narrowed down to the chamber "B" of the apparatus "a-1" in the process "X"_treatment "a" used commonly only for the wafer 2. Note that the chamber "A" of the apparatus "b-1" in the process "X"_treatment "b" is also used for the wafer 1 in addition to the wafer 2, and therefore, the suspected-cause of the characteristic defect is not narrowed down to this condition.

In the managing system for the semiconductor manufacturing apparatus according to the present embodiment, FIG. 12 is a flowchart of the embodiment for detecting the manufacturing apparatus, the chamber, or the manufacturing condition to be the cause of the defect based on the results of the characteristic defective ratio and the foreign-substance defective ratio of each process in each wafer (lot) calculated at the predicting unit 121 for the characteristic defect ratio and the foreign-substance defective ratio of each process. This flow for detecting the manufacturing apparatus, the chamber, or the manufacturing condition to be the cause of the defect shows a process mainly using the comparing unit 122 for the wafer history achieved by executing the history comparing program contained in the managing program.

[Step 400 in FIG. 12] Based on the results of the characteristic defective ratio and the foreign-substance defective ratio of each process in each wafer (lot or specific period) calculated at the predicting unit 121 for the characteristic defect ratio and the foreign-substance defective ratio of each process, the analytical-objective wafer is selected. At this time, such as a wafer with a high characteristic defective ratio and a wafer with a low characteristic defective ratio, or a wafer with a high foreign-substance defective ratio of the object process and a wafer with a low foreign-substance defective ratio thereof, a wafer of each cause of the defect to be identified is selected.

[Step 401 in FIG. 12] A data of the manufacturing history for the wafer selected at the above-described step 400 is obtained from the storage region 111 for the manufacturing history.

[Step 402 in FIG. 12] For the manufacturing history for each wafer obtained at the above-described step 401, a difference in each group at the above-described step 400 is analyzed, and a comparison result of the difference is stored in the storage region 115 for the analysis result and is also displayed on the display/output unit 140.

[Step 403 in FIG. 12] It is judged whether or not the analyses for all causes of the defect specified at the above-described step 400 have been completed. If they have been completed (Y), the process is ended. If they have not been completed (N), steps 402 and 403 are repeated.

<Effects of Embodiments>

According to the above-described embodiments, by calculating the number of foreign substances whose gap between the actual defective ratio and the fail-bit defective ratio is the smallest, the fail-bit defective ratio being predicted by using an arbitrary number of foreign substances of each process and the critical area in other fail bit modes except for the fail bit mode where the characteristic defect occurs, and setting the defective ratio calculated from this number of foreign substances of each process as the foreign-substance defective ratio, the gap between this foreign-substance defective ratio and the actual defective ratio can be quantified as the characteristic defective ratio.

Also, based on the calculation results of the characteristic defective ratio and the foreign-substance defective ratio of each process, the cause of the defect is separated as separating between a wafer with a high defect occurrence ratio and a wafer with a low defect occurrence ratio to be the object, and their manufacturing histories are compared with each other, so that the apparatus, the chamber, and the manufacturing condition to be the cause of the objective defect can be identified.

That is, in recent years, microfabrication for a wiring pitch has been promoted, and the ratio of occurrence of the characteristic defect has been increased. The characteristic defect is different from a defect due to foreign substances occurring inside an apparatus at random, and variations in a cause of the occurrence and a ratio of the occurrence are large for each wafer, and therefore, it is important to quantify the ratio of the occurrence for each wafer and connect the quantification with the identification of the cause. However, in conventional methods, only the foreign-substance defective ratio of each process can be quantified, and besides, all occurring defects are assumed to be the foreign-substance defects, and therefore, a problem of low accuracy of prediction arises for the wafer with the high ratio of occurrence of the characteristic defect.

Contrarily, in the present embodiments, the characteristic defective ratio and the foreign-substance defective ratio of each process can be calculated with high accuracy for each wafer, and therefore, the present embodiments are significantly effective. Also, by comparing and analyzing the manufacturing history based on the cause of the defect for each wafer obtained by a result of the calculation, a difference in the manufacturing apparatus, the chamber, and the manufacturing condition between the wafer with the high defect occurrence ratio and the wafer with the low defect occurrence ratio to be the objects can be clarified. These methods can contribute to improvement in yield of a memory device by early clarifying the cause of the defect.

In this manner, according to the present embodiments, the characteristic defective ratio and the foreign-substance defective ratio of each process can be quantified with high accuracy for each result of the objective fail-bit analysis. Therefore, by applying the method to a plurality of wafers, manufacturing apparatuses and manufacturing conditions can be compared with each other and analyzed based on the difference in the defective ratio for each wafer and each cause of the defect, so that the present embodiments can contribute to quickly start up the yield by accelerating the identification of the cause.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in the above-described embodiments, while the managing system 100 for the semiconductor manufacturing apparatus is described as the example, the present invention can be recognized as a technique including the following categories:

(1) A defective-ratio predicting method mainly using the predicting unit 121 for the characteristic defect ratio and the foreign-substance defective ratio of each process, and a defective-ratio predicting program of achieving this defective-ratio predicting method, and further, a defective-ratio predicting system including, as a component, the predicting unit 121 for the characteristic defect ratio and the foreign-substance defective ratio of each process.

(2) A history comparing method mainly using the comparing unit 122 for the wafer history, and a history comparing program of achieving this history comparing method, and further, a history comparing system including, as a component, the comparing unit 122 for the wafer history.

(3) With combining (1) and (2), a managing method for the semiconductor manufacturing apparatus mainly using the predicting unit 121 for the characteristic defective ratio and the foreign-substance defective ratio of each process and the comparing unit 122 for the wafer history, a managing program of achieving this managing method, and further, a managing system for the semiconductor manufacturing apparatus including, as components, the predicting unit 121 for the characteristic defective ratio and the foreign-substance defective ratio of each process and the comparing unit 122 for the wafer history.

(4) A manufacturing method for a semiconductor device using the managing method for the semiconductor manufacturing apparatus in (3), and a manufacturing system for the semiconductor device including, as a component, the managing system for the semiconductor manufacturing apparatus.

INDUSTRIAL APPLICABILITY

In a product which is a thin-film device as represented by an LSI and on which one or a plurality of memory devices are mounted, the present invention can be utilized for a method of discriminating a type of a defect by using electrical test results and layout simulation results, a managing method for a semiconductor manufacturing apparatus by comparing histories of the manufacturing apparatuses based on results of the discrimination and specifying a cause of the defect of each type, and a manufacturing method for the semiconductor device using the managing method.

The invention claimed is:

1. A defective-ratio predicting method in a system having
 a storage unit for storing an actual defective ratio of each fail bit mode of a memory device and a critical area of each process and each fail bit mode calculated by a layout simulation in which a plurality of foreign substances are virtually dropped at random onto a design layout whose wiring names are previously defined, and
 a predicting unit for calculating a characteristic defective ratio and a foreign-substance defective ratio by using the actual defective ratio of each fail bit mode and the critical area of each process and each fail bit mode, wherein
 the predicting unit executes the defective-ratio predicting method comprising:
 a first step of obtaining the actual defective ratio of each fail bit mode and the critical area of each process and each fail bit mode stored in the storage unit;

a second step of selecting a fail bit mode, whose gap between the actual defective ratio of each fail bit mode except for the arbitrary fail bit mode and a foreign-substance defective ratio of each fail bit mode calculated by using the critical area of each process and each fail bit mode and an arbitrary number of foreign substances is the largest;

a third step of calculating a fail bit mode, whose gap between the actual defective ratio of each fail bit mode and the foreign-substance defective ratio of each fail bit mode calculated by using a new number of foreign substances calculated by matching the arbitrary number of foreign substances by a first matching of the number of foreign substances based on the largest gap between the foreign-substance defective ratio and the actual defective ratio of the fail bit mode;

a fourth step of, after updating the number of foreign substances by a plurality of times of the matching such as a second matching of the number of foreign substances based on the largest gap between the foreign-substance defective ratio and the actual defective ratio of the fail bit mode, calculating the foreign-substance defective ratio of each process and the foreign-substance defective ratio of each fail bit mode by using the number of foreign substances obtained by the number of times of the matching by which the gap between the foreign-substance defective ratio of each fail bit mode and the actual defective ratio of each fail bit mode is the smallest; and a fifth step of calculating a characteristic defective ratio of the arbitrary fail bit mode based on the foreign-substance defective ratio of each fail bit mode and the actual defective ratio of each fail bit mode.

2. The defective-ratio predicting method according to claim 1, wherein,
when the number of foreign substances of each process is calculated at the second step, at least one solving method including a least-square method, multiple regression, mathematical programming, and inverse matrix calculation is used.

3. The defective-ratio predicting method according to claim 1, wherein
the arbitrary fail bit mode is a single-bit mode.

4. The defective-ratio predicting method according to claim 1, wherein,
for the actual defective ratio of each fail bit mode, a result obtained under at least one or more power supply voltages, at least one or more temperature conditions, or at least one or more fail bit test patterns is used.

5. The defective-ratio predicting method according to claim 1, wherein,
for the actual defective ratio of each fail bit mode and the critical area of each process and each fail bit mode, an actual defective ratio of each fail bit mode and a critical area of each process and each fail bit mode in at least two or more memory cells including a memory cell having a plurality of types in which wiring dimensions and/or layouts are different from each other and a logic cell are used.

6. The defective-ratio predicting method according to claim 1, wherein,
for the actual defective ratio of each fail bit mode, an actual defective ratio of each fail bit mode for any one of a wafer unit, a lot unit, a specific period unit, and an arbitrary wafer unit is used.

7. The defective-ratio predicting method according to claim 1, wherein, in addition to the actual defective ratio of each fail bit mode and the critical area of each process and each fail bit mode, an actual defective ratio of at least one or more functional modules and a critical area of each process of a functional module calculated by a simulation in which a plurality of foreign substances are virtually dropped at random onto a design layout are used.

8. The defective-ratio predicting method according to claim 7, wherein,
for the actual defective ratio of the functional module, a result obtained under at least one or more power supply voltages, at least one or more temperature conditions, or at least one or more test categories is used.

9. The defective-ratio predicting method according to claim 1, wherein the arbitrary fail bit mode is a single-bit mode.

10. The defective-ratio predicting method according to claim 1, wherein,
for the actual defective ratio of each fail bit mode, a result obtained under at least one or more power supply voltages, at least one or more temperature conditions, or at least one or more fail bit test patterns is used.

11. The defective-ratio predicting method according to claim 1, wherein,
for the actual defective ratio of each fail bit mode and the critical area of each process and each fail bit mode, an actual defective ratio of each fail bit mode and a critical area of each process and each fail bit mode in at least two or more memory cells including a memory cell having a plurality of types in which wiring dimensions and/or layouts are different from each other and a logic cell are used.

12. The defective-ratio predicting method according to claim 1, wherein,
for the actual defective ratio of each fail bit mode, an actual defective ratio of each fail bit mode for any one of a wafer unit, a lot unit, a specific period unit, and an arbitrary wafer unit is used.

13. The defective-ratio predicting method according to claim 1, wherein,
in addition to the actual defective ratio of each fail bit mode and the critical area of each process and each fail bit mode, an actual defective ratio of at least one or more functional modules and a critical area of each process of a functional module calculated by a simulation in which a plurality of foreign substances are virtually dropped at random onto a design layout are used.

14. The defective-ratio predicting method according to claim 13, wherein,
for the actual defective ratio of the functional module, a result obtained under at least one or more power supply voltages, at least one or more temperature conditions, or at least one or more test categories is used.

15. A managing method for a semiconductor manufacturing apparatus in a system having
a storage unit for storing an actual defective ratio of each fail bit mode of a memory device and a critical area of each process and each fail bit mode calculated by a layout simulation in which a plurality of foreign substances are virtually dropped at random onto a design layout whose wiring names are previously defined,
a predicting unit for quantifying a gap between a foreign-substance defective ratio and an actual defective ratio as a characteristic defective ratio, the foreign-substance defective ratio being obtained as a defective ratio calculated from the number of foreign substances of each process that is obtained as a result of matching of the number of foreign substances of each process so that a gap between the actual defective ratio of each fail bit mode and a fail-bit defective ratio calculated by using the critical area of each process and each fail bit mode is the smallest, and a comparing unit for comparing and analyzing a manufacturing history of each wafer, the managing method comprising:

obtaining, by the predicting unit, the actual defective ratio of each fail bit mode and the critical area of each process and each fail bit mode stored in the storage unit, and calculating the characteristic defective ratio and the foreign-substance defective ratio of each process by using the obtained actual defective ratio of each fail bit mode and the obtained critical area of each process and each fail bit mode; and comparing, by the comparing unit, the manufacturing history of each wafer based on the characteristic defective ratio and the foreign-substance defective ratio of each process calculated by the predicting unit or based on ratios of occurrence of the characteristic defective ratio and the foreign-substance defective ratio, and calculating a defect-suspected manufacturing apparatus and manufacturing condition from a result of the comparison.

16. The managing method for the semiconductor manufacturing apparatus according to claim 15, wherein the predicting unit calculates the characteristic defective ratio and the foreign-substance defective ratio of each process by using in addition to the actual defective ratio of each fail bit mode and the critical area of each process and each fail bit mode, an actual defective ratio of at least one or more functional modules and a critical area of at least one or more functional modules.

17. A manufacturing method for a semiconductor device with using the managing method for the semiconductor manufacturing apparatus according to claim 15 for manufacturing the semiconductor device on which the memory device is mounted.

* * * * *